United States Patent [19]

Marthaller

[11] Patent Number: 5,820,382
[45] Date of Patent: Oct. 13, 1998

[54] MULTIFILICATION QUIZZER

[76] Inventor: Lary J. Marthaller, P.O. Box 807, Dickinson, N. Dak. 58601

[21] Appl. No.: 705,173

[22] Filed: Aug. 29, 1996

[51] Int. Cl.$^6$ ..................................................... G09B 1/00
[52] U.S. Cl. ........................ 434/209; 434/199; 434/191; 434/348
[58] Field of Search ................................... 434/209, 348, 434/199, 191, 188, 405

[56] References Cited

U.S. PATENT DOCUMENTS

| | | | |
|---|---|---|---|
| 3,106,029 | 10/1963 | Desmond | 434/405 X |
| 3,461,572 | 8/1969 | Schmidt et al. | |
| 3,491,193 | 1/1970 | Bianchi | 434/199 X |
| 3,586,333 | 6/1971 | Abney | 273/131 K |
| 4,218,609 | 8/1980 | Chin | 235/76 |
| 4,262,939 | 4/1981 | Schoettle, Jr. | 283/65 |
| 5,338,203 | 8/1994 | Rheams | 434/208 |
| 5,449,890 | 9/1995 | van Neck | 235/70 R |

FOREIGN PATENT DOCUMENTS 22445  of 1911  United Kingdom ................... 434/209

*Primary Examiner*—Jeffrey A. Smith
*Attorney, Agent, or Firm*—Richard L. Miller, P.E.

[57] ABSTRACT

A multiplication quizzer that allows a user to learn the multiplication tables. The quizzer includes a base member, at least one first obliquely-forwardly-downwardly-oriented multiplication table disposed on a first side of the base member, at least one second obliquely-forwardly-downwardly-oriented multiplication table disposed on a second opposing side of the base member, and an opaque slide member that is longitudinally slidable along the base member. The obliquely-forwardly-downwardly orientation of the at least one first and second obliquely-forwardly-downwardly-oriented multiplication tables allows the opaque slide member to slid over and hid a product of a desired linear multiplication expression being quizzed of one of the at least one first and second obliquely-forwardly-downwardly-oriented multiplication tables, so that it is not visible while being quizzed, while simultaneously covering and hiding products of three directly subsequent linear multiplication expressions yet to be quizzed of the one of the at least one first and second obliquely-forwardly-downwardly-oriented multiplication tables.

24 Claims, 2 Drawing Sheets

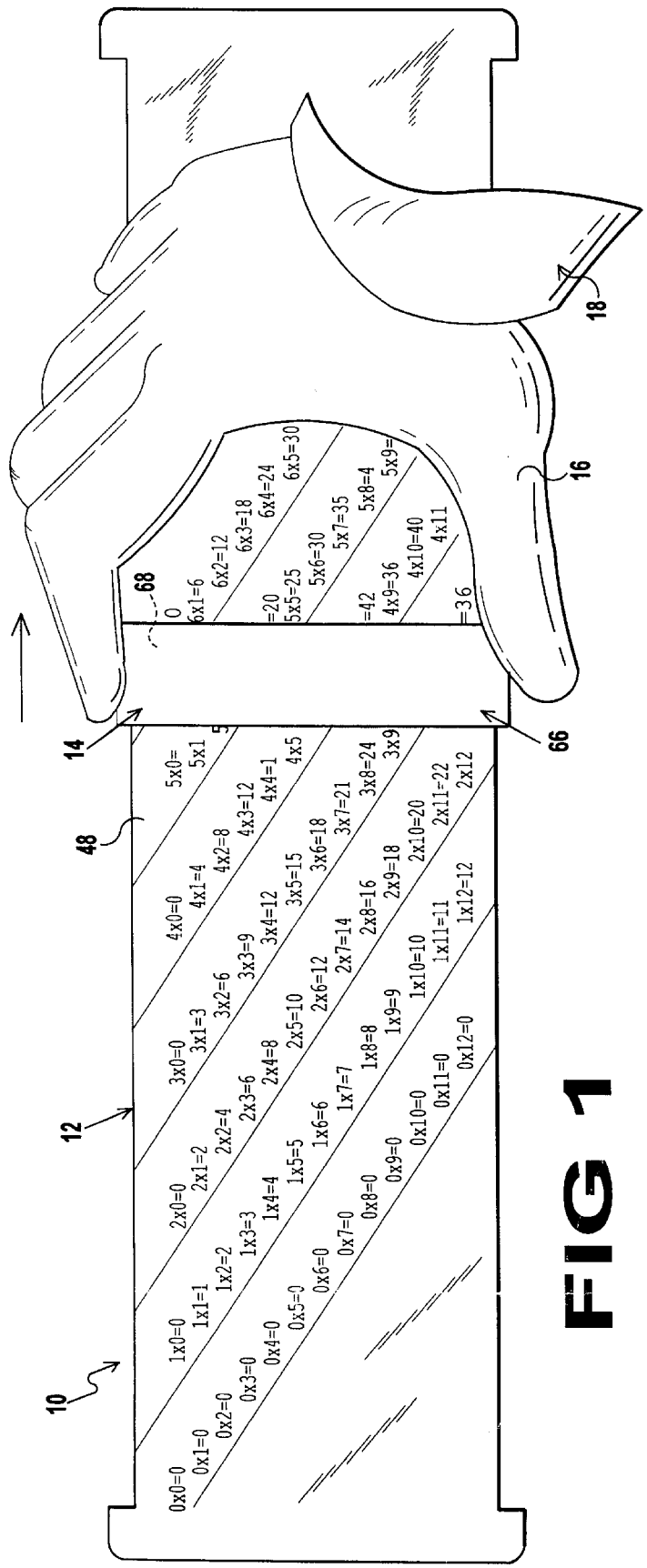
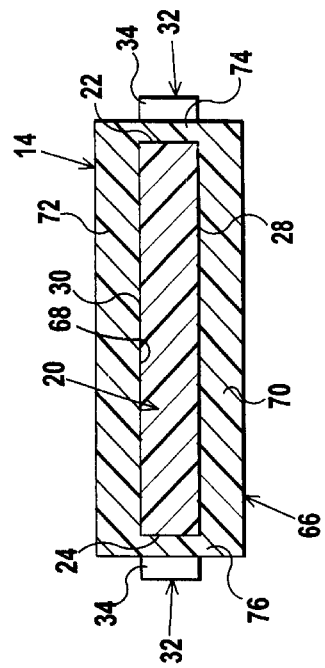

MULTIFILICATION QUIZZER

BACKGROUND OF THE INVENTION

The present invention relates to a multiplication quizzer. More particularly, the present invention relates to a multiplication quizzer that allows a user to learn the multiplication tables. The quizzer includes a base member, at least one first obliquely-forwardly-downwardly-oriented multiplication table disposed on a first side of the base member, at least one second obliquely-forwardly-downwardly-oriented multiplication table disposed on a second opposing side of the base member, and an opaque slide member that is longitudinally slidable along the base member. The obliquely-forwardly-downwardly orientation of the at least one first and second obliquely-forwardly-downwardly-oriented multiplication tables allows the opaque slide member to slid over and hid a product of a desired linear multiplication expression being quizzed of one of the at least one first and second obliquely-forwardly-downwardly-oriented multiplication tables, so that it is not visible while being quizzed, while simultaneously covering and hiding products of three directly subsequent linear multiplication expressions yet to be quizzed of the one of the at least one first and second obliquely-forwardly-downwardly-oriented multiplication tables, so that they cannot be viewed and memorized prior to being quizzed, and allowing the opaque slide member to slide slightly to the right sufficiently to expose the product of the desired linear multiplication expression being quizzed of the one of the at least one first and second obliquely-forwardly-downwardly-oriented multiplication tables while simultaneously exposing a multiplier, an operator, and a multiplicand of a directly subsequent linear multiplication expression yet to be quizzed of the one of the at least one first and second obliquely-forwardly-downwardly-oriented multiplication tables, so that it can be subsequently quizzed, and simultaneously covering and hiding a product of the directly subsequent linear multiplication expression yet to be quizzed of the one of the at least one first and second obliquely-forwardly-downwardly-oriented multiplication tables, so that it is not visible when being subsequently quizzed.

In the instructional field, it is well known that the learning process can be greatly enhanced if the student is provided with some sort of instructional device to help him learn in a particular subject matter area. This is particularly true in arithmetic and mathematics, where the student is dealing with a great amount of facts that must be learned for comprehension of the subject matter. Making the learning process even more difficult in this area are the variation and number of numbering systems with which a student should, or could, become familiar. As scientific and technological advancements are made, and particularly in the field of computers and other electronic machines, entire new number languages are being formed with which a student must become conversant.

When comparing or carrying out comparisons and simple arithmetic computations with various numbering systems, the student, in the past, has been required to consult tabular comparisons between numbering systems either in the form of a printed page or a printed device of some nature. Although this may be sufficient for a simple comparison of one number in one numbering system with another numbering system, to find the corresponding symbol standing for such number, it is impossible to carry out simple arithmetic computations, such as adding and subtracting, without using separate means on which to write out in longhand the various computational steps necessary.

Numerous innovations for mathematical learning devices have been provided in the prior art that will be described. Even though these innovations may be suitable for the specific individual purposes to which they address, however, they differ from the present invention in that they do not teach a multiplication quizzer that allows a user to learn the multiplication tables. The quizzer includes a base member, at least one first obliquely-forwardly-downwardly-oriented multiplication table disposed on a first side of the base member, at least one second obliquely-forwardly-downwardly-oriented multiplication table disposed on a second opposing side of the base member, and an opaque slide member that is longitudinally slidable along the base member. The obliquely-forwardly-downwardly orientation of the at least one first and second obliquely-forwardly-downwardly-oriented multiplication tables allows the opaque slide member to slid over and hid a product of a desired linear multiplication expression being quizzed of one of the at least one first and second obliquely-forwardly-downwardly-oriented multiplication tables, so that it is not visible while being quizzed, while simultaneously covering and hiding products of three directly subsequent linear multiplication expressions yet to be quizzed of the one of the at least one first and second obliquely-forwardly-downwardly-oriented multiplication tables, so that they cannot be viewed and memorized prior to being quizzed, and allowing the opaque slide member to slide slightly to the right sufficiently to expose the product of the desired linear multiplication expression being quizzed of the one of the at least one first and second obliquely-forwardly-downwardly-oriented multiplication tables while simultaneously exposing a multiplier, an operator, and a multiplicand of a directly subsequent linear multiplication expression yet to be quizzed of the one of the at least one first and second obliquely-forwardly-downwardly-oriented multiplication tables, so that it can be subsequently quizzed, and simultaneously covering and hiding a product of the directly subsequent linear multiplication expression yet to be quizzed of the one of the at least one first and second obliquely-forwardly-downwardly-oriented multiplication tables, so that it is not visible when being subsequently quizzed.

FOR EXAMPLE, U.S. Pat. No. 3,461,572 to Schmidt teaches an instructional device in which a base member has mounted thereon, in spaced relation, a pair of spaced cover members. A slide member is slidably disposed between the cover members. Numbering systems are indicated on scales slidable between each of the dover members and the base member as well as on the slide member, and transversely aligned so that the symbols of one system may be compared with the symbols of another system. Simple arithmetic computations may be carried out by movement of the slide member relative to the cover members.

ANOTHER EXAMPLE, U.S. Pat. No. 3,586,333 to Abney teaches a mathematical game board that is divided into four sections, each of which is coded. Each of the sections is divided into numbered areas with the numbers increasing progressively from the center of the board outwardly to the side of the board. Each of the areas is divided into one system of basic mathematics, division, subtraction, addition, and multiplication. Each of such areas is progressively increasingly numbered from left to right, top to bottom, with numerals impressed thereon. A set of playing blocks is provided for each of the sections and is also coded to match the correspondingly coded section. A slot is cut in each of the blocks for positioning according to the number of such block, with the position of such slot being determined by the number of the block, and with the numerical order being from left to right, top to bottom, such that, for example, a block for the numeral two would have a slot positioned inwardly from the left hand side of such block and along the upper edge of such block.

STILL ANOTHER EXAMPLE, U.S. Pat. No. 4,218,609 to Chin teaches a mechanical calculator that employs a register consisting of gears. Each register gear has two sets of teeth. One set has teeth all around the circumference of the wheel, while the other set consists of a single carry-over tooth. The register gears are spaced widely enough apart that they do not engage one another. An intermittent carry-over motion is transmitted from one register gear to an adjacent register gear by a selectively insertable and removable carry-over gear, which is mechanically unconnected to the remainder of the calculator. The operations of multiplication and division are enabled by a set of individually selectively insertable and removable multiplying gears. The number of teeth on these gears, and their diameters, are integral multiples of those on the register gears. The multiplying gears are mechanically unconnected to the remainder of the calculator.

YET ANOTHER EXAMPLE, U.S. Pat. No. 4,262,939 to Schoettle, Jr. teaches a method for the manufacture of a slide chart, utilizing high speed, straight line gluing and folding machinery from a unitary blank having a flat sheet separated into three segments. A first and second segment being provided with openings and forming the faces of the manufactured slide chart. A third segment having scored lines longitudinally extending therethrough to form a railed slide located between the faces of the manufactured slide chart. The method comprises applying glue to the longitudinal edges of the second or third segment, folding the second and third segment onto each other applying glue to the longitudinal edges of the first or third segment, folding the first and third segment onto each other, and trimming the transverse edges of the resulting slide chart assembly, thereby freeing the slide to move between a pair of rails and the faces of the slide chart to provide a finished slide chart of substantial precision.

STILL YET ANOTHER EXAMPLE, U.S. Pat. No. 5,338,203 to Rheams teaches a mathematics teaching aid for recognition of numerical and functional equivalents and spatial relationships having tiles marked with numerals, functions, and equals and a baseboard with intersecting rows of spaces where two to four students can form linear equations by aligning the proper tiles on the baseboard which intersect at right angles and share one tile.

FINALLY, YET STILL ANOTHER EXAMPLE, U.S. Pat. No. 5,449,890 to van Neck teaches a slide calculator that includes a sleeve having a plurality of windows for presenting data from three variables arranged in matrices of rows and columns. Opposite sides of the sliding card include data with the rows and columns interchanged. The sleeve surrounding the sliding card is lined with a transparent plastic.

It is apparent that numerous innovations for mathematical learning devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a multiplication quizzer that avoids the disadvantages of the prior art.

ANOTHER OBJECT of the present invention is to provide a multiplication quizzer that is simple and inexpensive to manufacture.

STILL ANOTHER OBJECT of the present invention is to provide a multiplication quizzer that is simple to use.

YET ANOTHER OBJECT of the present invention is to provide a multiplication quizzer that helps anyone who is learning their multiplication tables.

STILL YET ANOTHER OBJECT of the present invention is to provide a multiplication quizzer that helps anyone who is learning their multiplication tables that makes learning the multiplication tables faster and easier.

YET STILL ANOTHER OBJECT of the present invention is to provide a multiplication quizzer that is a great helps in learning the multiplication tables, especially in the earlier years of school and further on.

STILL YET ANOTHER OBJECT of the present invention is to provide a multiplication quizzer that can be used over and over again, year after year.

YET STILL ANOTHER OBJECT of the present invention is to provide a multiplication quizzer that has only one moving part that covers the answer to any given multiplication problem.

BRIEFLY STATED, STILL YET ANOTHER OBJECT of the present invention is to provide a multiplication quizzer that includes a base member, first indicia, second indicia, and an opaque slide member.

YET STILL ANOTHER OBJECT of the present invention is to provide a multiplication quizzer wherein the base member has an elongated, thin, slender, and rectangular-parallelepiped-shaped body with a flat, elongated, and rectangular-shaped first face the flat, elongated, and rectangular-shaped first face of the elongated, thin, slender, and rectangular-parallelepiped-shaped body of the base member and the at least one obliquely-forwardly-downwardly-oriented multiplication table of the second indica on the flat, elongated, and rectangular-shaped second face of the elongated, thin, slender, and rectangular-parallelepiped-shaped body of the base member allows the opaque slide member to slid over and hid a product of a desired linear multiplication expression being quizzed of the at least one obliquely-forwardly-downwardly-oriented multiplication table of one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member, so that it is not visible while being quizzed, while simultaneously covering and hiding products of three directly subsequent linear multiplication expressions yet to be quizzed of the at least one obliquely-forwardly-downwardly-oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member, so that they cannot be viewed and memorized prior to being quizzed, and allowing the opaque slide member to slide slightly to the right sufficiently to expose the product of the desired linear multiplication expression being quizzed of the at least one obliquely-forwardly-downwardly-oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular- and a flat, elongated, and rectangular-shaped second face parallel to, and spaced from, the flat, elongated, and rectangular-shaped first face of the elongated, thin, slender, and rectangular-parallelepiped-shaped body of the base member.

STILL YET ANOTHER OBJECT of the present invention is to provide a multiplication quizzer wherein the first indica is disposed on the flat, elongated, and rectangular-shaped first face of the elongated, thin, slender, and rectangular-parallelepiped-shaped body of the base member.

YET STILL ANOTHER OBJECT of the present invention is to provide a multiplication quizzer wherein the first indica on, the flat, elongated, and rectangular-shaped first face of the elongated, thin, slender, and rectangular-parallelepiped-shaped body of the base member includes at least one obliquely-forwardly-downwardly-oriented multiplication table that has an obliquely-forwardly-downwardly orientation.

STILL YET ANOTHER OBJECT of the present invention is, to provide a multiplication quizzer wherein the second indica is disposed on the flat, elongated, and rectangular-shaped second face of the elongated, thin, slender, and rectangular-parallelepiped-shaped body of the base member.

YET STILL ANOTHER OBJECT of the present invention is to provide a multiplication quizzer wherein the second indica on the flat, elongated, and rectangular-shaped first face of the elongated, thin, slender, and rectangular-parallelepiped-shaped body of the base member includes at least one obliquely-forwardly-downwardly-oriented multiplication table that has an obliquely-forwardly-downwardly orientation.

STILL YET ANOTHER OBJECT of the present invention is to provide a multiplication quizzer wherein the opaque slide member is longitudinally slidable along the base member.

YET STILL ANOTHER OBJECT of the present invention is to provide a multiplication quizzer wherein the obliquely-forwardly-downwardly orientation of the at least one obliquely-forwardly-downwardly-oriented multiplication table of the first indica on parallelepiped-shaped body of the base member while simultaneously exposing a multiplier, an operator, and a multiplicand of a directly subsequent linear multiplication expression yet to be quizzed of the at least one obliquely-forwardly-downwardly-oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member, so that it can be subsequently quizzed, and while simultaneously covering and hiding a product of the directly subsequent linear multiplication expression yet to be quizzed of the at least one obliquely-forwardly-downwardly-oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member, so that it is not visible when being subsequently quizzed.

STILL YET ANOTHER OBJECT of the present invention is to provide a multiplication quizzer wherein the base member is selected from the group consisting of pressboard, plastic, rubber, wood, and metal, so that the base member is of sturdy construction.

YET STILL ANOTHER OBJECT of the present invention is to provide a multiplication quizzer wherein the elongated, thin, slender, and rectangular-parallelepiped-shaped body of the base member further has a thin and straight upper longitudinal side with ends, a thin and straight lower longitudinal side with ends and spaced below, and parallel to, the thin and straight upper longitudinal side of the elongated, thin, slender, and rectangular-parallelepiped-shaped body of the base member, a pair of thin, straight, spaced-apart, and parallel lateral ends that perpendicularly connect the ends of the thin and straight upper longitudinal side of the elongated, thin, slender, and rectangular-parallelepiped-shaped body of the base member to respective the ends of the thin and straight lower longitudinal side of the elongated, thin, slender, and rectangular-parallelepiped-shaped body of the base member.

STILL YET ANOTHER OBJECT of the present invention is to provide a multiplication quizzer wherein the flat, elongated, and rectangular-shaped first face of the elongated, thin, slender, and rectangular-parallelepiped-shaped body of the base member extends from one end of the pair of thin, straight, spaced-apart, and parallel lateral ends of the elongated, thin, slender, and rectangular-parallelepiped-shaped body of the base member to another end of the pair of thin, straight, spaced-apart, and parallel lateral ends of the elongated, thin, slender, and rectangular-parallelepiped-shaped body of the base member, and from the thin and straight upper longitudinal side of the elongated, thin, slender, and rectangular-parallelepiped-shaped body of the base member to the thin and straight lower longitudinal side of the elongated, thin, slender, and rectangular-parallelepiped-shaped body of the base member.

YET STILL ANOTHER OBJECT of the present invention is to provide a multiplication quizzer wherein the flat, elongated, and rectangular-shaped second face of the elongated, thin, slender, and rectangular-parallelepiped-shaped body of the base member is parallel to, and spaced from, the flat, elongated, and rectangular-shaped first face of the elongated, thin, slender, and rectangular-parallelepiped-shaped body of the base member.

STILL YET ANOTHER OBJECT of the present invention is to provide a multiplication quizzer wherein the flat, elongated, and rectangular-shaped second face of the elongated, thin, slender, and rectangular-parallelepiped-shaped body of the base member extends from the one end of the pair of thin, straight, spaced-apart, and parallel lateral ends of the elongated, thin, slender, and rectangular-parallelepiped-shaped body of the base member to the another end of the pair of thin, straight, spaced-apart, and parallel lateral ends of the elongated, thin, slender, and rectangular-parallelepiped-shaped body of the base member, and from the thin and straight upper longitudinal side of the elongated, thin, slender, and rectangular-parallelepiped-shaped body of the base member to the base thin and straight lower longitudinal side of the elongated, thin, slender, and rectangular-parallelepiped-shaped body of the base member.

YET STILL ANOTHER OBJECT of the present invention is to provide a multiplication quizzer wherein the elongated, thin, slender, and rectangular-parallelepipedshaped body of the base member is approximately 10.125" long, 0.0625" thick, and 2.25" wide.

STILL YET ANOTHER OBJECT of the present invention is to provide a multiplication quizzer wherein the base member further has a pair of slender and spaced-apart lateral end extensions that are coplanar with the elongated, thin, slender, and rectangular-parallelepiped-shaped body of the base member.

YET STILL ANOTHER OBJECT of the present invention is to provide a multiplication quizzer wherein each extension of the pair of slender and spaced-apart lateral end extensions is integrally formed with a respective end of the pair of thin, straight, spaced-apart, and parallel lateral ends of the elongated, thin, slender, and rectangular-parallelepiped-shaped body of the base member and extends perpendicularly outwardly past the thin and straight upper longitudinal side of the elongated, thin, slender, and rectangular-parallelepiped-shaped body of the base member and the thin and straight lower longitudinal side of the elongated, thin, slender, and rectangular-parallelepiped-shaped body of the base member so as to form therewith stops, so that the opaque slide member is prevented from sliding off the base member when the slide member is slid longitudinally therealong.

STILL YET ANOTHER OBJECT of the present invention is to provide a multiplication quizzer wherein the each extension of the pair of slender and spaced-apart lateral end extensions is approximately 0.375" wide and extends approximately 0.125" perpendicularly outwardly past the thin and straight upper longitudinal side of the elongated, thin, slender, and rectangular-parallelepiped-shaped body of the base member and the thin and straight lower longitudinal side of the elongated, thin, slender, and rectangular-parallelepiped-shaped body of the base member.

YET STILL ANOTHER OBJECT of the present invention is to provide a multiplication quizzer wherein the first indica on the flat, elongated, and rectangular-shaped first face of the elongated, thin, slender, and rectangular-parallelepiped-shaped body of the base member is one of printed on, typed on, and imprinted into, the flat, elongated, and rectangular-shaped first face of the elongated, thin, slender, and rectangular-parallelepiped-shaped body of the base member, so that little wear thereto is encountered.

STILL YET ANOTHER OBJECT of the present invention is to provide a multiplication quizzer wherein the second indica on the flat, elongated and rectangular-shaped second face of the elongated, thin, slender, and rectangular-parallelepiped-shaped body of the base member is one of printed on, typed on, and imprinted into, the flat, elongated, and rectangular-shaped second face of the elongated, thin, slender, and rectangular-parallelepiped-shaped body of the base member, so that little wear thereto is encountered.

YET STILL ANOTHER OBJECT of the present invention is to provide a multiplication quizzer wherein the obliquely-forwardly-downwardly-oriented multiplication table of the first indica on the flat, elongated, and rectangular-shaped first face of the elongated thin, slender, and rectangular-parallelepiped-shaped body of the base member includes an obliquely-forwardly-downwardly-oriented zero multiplication table that originates at the one end of the pair of thin, straight, spaced-apart, and parallel lateral ends of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented zero multiplication table of the first indica on the flat, elongated, and rectangular-shaped first face of the elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member 12, and includes linear multiplication expressions $0 \times 0 = 0$ to $0 \times 12 = 0$, inclusive, that are disposed consecutively in a column.

YET STILL ANOTHER OBJECT of the present invention is to provide a multiplication quizzer wherein each subsequent linear multiplication expression of the thirteen individual linear multiplication expressions of the obliquely-forwardly-downwardly-oriented zero multiplication table of the first face indica on the flat, elongated, and rectangular-shaped first face of the elongated, thin, slender, and rectangular-parallelepiped-shaped body of the base member is disposed below, and offset slightly to right of, a directly previous linear multiplication expression of the thirteen individual linear multiplication expressions of the obliquely-forwardly-downwardly-oriented zero multiplication table of the first indica on the flat, elongated, and rectangular-shaped first face of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented multiplication table of the first indica on the flat, elongated, and rectangular-shaped first face of the elongated, thin, slender, and rectangular-parallelepiped-shaped body of the base member further includes an obliquely-forwardly-downwardly-oriented one multiplication table that is disposed at adjacent right of the obliquely-forwardly-downwardly-oriented zero multiplication table of the first indica on the flat, elongated, and rectangular-shaped first face of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

YET STILL ANOTHER OBJECT of the present invention is to provide a multiplication quizzer wherein the obliquely-forwardly-downwardly-oriented one multiplication table of the first indica on the flat, elongated, and rectangular-shaped first face of the base member elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 1×0=0 to 1×12=12, inclusive, that are disposed consecutively in a column.

STILL YET ANOTHER OBJECT of the present invention is to provide a multiplication quizzer wherein each subsequent linear multiplication expression of the obliquely-forwardly-downwardly-oriented one multiplication table of the first indica on the flat, elongated, and rectangular-shaped first face of the elongated, thin, slender, and rectangular-parallelepiped-shaped body of the base member is disposed below, and offset slightly to right of, a directly previous linear multiplication expression of the obliquely-forwardly-downwardly-oriented one multiplication table of the first indica on the flat, elongated, and rectangular-shaped first face of the elongated, thin, slender, and rectangular-parallelepiped-shaped body of the base member.

YET STILL ANOTHER OBJECT of the present invention is to provide a multiplication quizzer wherein the obliquely-forwardly-downwardly-oriented multiplication table of the first indica on the flat, elongated, and rectangular-shaped first face of the elongated, thin, slender, and rectangular-parallelepiped-shaped body of the base member further includes an obliquely-forwardly-downwardly-oriented two multiplication table that is disposed at adjacent right of the obliquely-forwardly-downwardly-oriented one multiplication table of the first indica on the flat, elongated, and rectangular-shaped first face of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented two multiplication table of the first indica on the flat, elongated, and rectangular-shaped first face of the base member elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 2×0=0 to 2×12=24, inclusive, that are disposed consecutively in a column.

YET STILL ANOTHER OBJECT of the present invention is to provide a multiplication quizzer wherein each subsequent linear multiplication expression of the obliquely-forwardly-downwardly-oriented two multiplication table of the first indica on the flat, elongated, and rectangular-shaped first face of the elongated, thin, slender, and rectangular-parallelepiped-shaped body of the base member is disposed below, and offset slightly to right of, a directly previous linear multiplication expression of the obliquely-forwardly-downwardly-oriented two multiplication table of the first indica on the flat, elongated, and rectangular-shaped first face of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented multiplication table of the first indica on the flat, elongated, and rectangular-shaped first face of the elongated, thin, slender, and rectangular-parallelepiped-shaped body of the base member further includes an obliquely-forwardly-downwardly-oriented three multiplication table that is disposed at adjacent right of the obliquely-forwardly-downwardly-oriented two multiplication table of the first indica on the flat, elongated, and rectangular-shaped first face of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

YET STILL ANOTHER OBJECT of the present invention is to provide a multiplication quizzer wherein the obliquely-forwardly-downwardly-oriented three multiplication table of the first indica on the flat, elongated, and rectangular-shaped first face of the base member elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 3×0=0 to 3×12=36, inclusive, that are disposed consecutively in a column.

STILL YET ANOTHER OBJECT of the present invention is to provide a multiplication quizzer wherein each subsequent linear multiplication expression of the obliquely-forwardly-downwardly-oriented three multiplication table of the first indica on the flat, elongated, and rectangular-shaped first face of the elongated, thin, slender, and rectangular-parallelepiped-shaped body of the base member is disposed below, and offset slightly to right of, a directly previous linear multiplication expression of the obliquely-forwardly-downwardly-oriented three multiplication table of the first indica on the flat, elongated, and rectangular-shaped first face of the elongated, thin, slender, and rectangular-parallelepiped-shaped body of the base member.

YET STILL ANOTHER OBJECT of the present invention is to provide a multiplication quizzer wherein the obliquely-forwardly-downwardly-oriented multiplication table of the first indica on the flat, elongated, and rectangular-shaped first face of the elongated, thin, slender, and rectangular-parallelepiped-shaped body of the base member further includes an obliquely-forwardly-downwardly-oriented four multiplication table that is disposed at adjacent right of the obliquely-forwardly-downwardly-oriented three multiplication table of the first indica on the flat, elongated, and rectangular-shaped first face of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented four multiplication table of the first indica on the flat, elongated, and rectangular-shaped first face of the base member elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 4×0=0 to 4×12=48, inclusive, that are disposed consecutively in a column.

YET STILL ANOTHER OBJECT of the present invention is to provide a multiplication quizzer wherein each subsequent linear multiplication expression of the obliquely-forwardly-downwardly-oriented four multiplication table of the first indica on the flat, elongated, and rectangular-shaped first face of the elongated, thin, slender, and rectangular-parallelepiped-shaped body of the base member is disposed below, and offset slightly to right of, a directly previous linear multiplication expression of the obliquely-forwardly-downwardly-oriented four multiplication table of the first indica on the flat, elongated, and rectangular-shaped first face of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented multiplication table of the first indica on the flat, elongated, and rectangular-shaped first face of the elongated, thin, slender, and rectangular-parallelepiped-shaped body of the base member further includes an obliquely-forwardly-downwardly-oriented five multiplication table that is disposed at adjacent right of the obliquely-forwardly-downwardly-oriented four multiplication table of the first indica on the flat, elongated, and rectangular-shaped first face of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

YET STILL ANOTHER OBJECT of the present invention is to provide a multiplication quizzer wherein the obliquely-forwardly-downwardly-oriented five multiplication table of the first indica on the flat, elongated, and rectangular-shaped first face of the base member elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 5×0=0 to 5×12=60, inclusive, that are disposed consecutively in a column.

STILL YET ANOTHER OBJECT of the present invention is to provide a multiplication quizzer wherein each subsequent linear multiplication expression of the obliquely-forwardly-downwardly-oriented five multiplication table of the first indica on the flat, elongated, and rectangular-shaped first face of the elongated, thin, slender, and rectangular-parallelepiped-shaped body of the base member is disposed below, and offset slightly to right of, a directly previous linear multiplication expression of the obliquely-forwardly-downwardly-oriented five multiplication table of the first indica on the flat, elongated, and rectangular-shaped first face of the elongated, thin, slender, and rectangular-parallelepiped-shaped body of the base member.

YET STILL ANOTHER OBJECT of the present invention is to provide a multiplication quizzer wherein the obliquely-forwardly-downwardly-oriented multiplication table of the first indica on the flat, elongated, and rectangular-shaped first face of the elongated, thin, slender, and rectangular-parallelepiped-shaped body of the base member further includes an obliquely-forwardly-downwardly-oriented six multiplication table that is disposed at adjacent right of the obliquely-forwardly-downwardly-oriented five multiplication table of the first indica on the flat, elongated, and rectangular-shaped first face of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented six multiplication table of the first indica on the flat, elongated, and rectangular-shaped first face of the base member elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 6×0=0 to 6×12=72, inclusive, that are disposed consecutively in a column.

YET STILL ANOTHER OBJECT of the present invention is to provide a multiplication quizzer wherein each subsequent linear multiplication expression of the obliquely-forwardly-downwardly-oriented six multiplication table of the first indica on the flat, elongated, and rectangular-shaped first face of the elongated, thin, slender, and rectangular-parallelepiped-shaped body of the base member is disposed below, and offset slightly to right of, a directly previous linear multiplication expression of the obliquely-forwardly-downwardly-oriented six multiplication table of the first indica on the flat, elongated, and rectangular-shaped first face of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented multiplication table of the second indica on the flat, elongated, and rectangular-shaped second face of the elongated, thin, slender, and rectangular-parallelepiped-shaped body of the base member includes an obliquely-forwardly-downwardly-oriented seven multiplication table that originates at the one end of the pair of thin, straight, spaced-apart, and parallel lateral ends of the elongated, thin, slender, and rectangular-parallelepiped-shaped body of the base member, and YET STILL ANOTHER OBJECT of the present invention is to provide a multiplication quizzer wherein the obliquely-forwardly-downwardly-oriented multiplication table of the second indica on the flat, elongated, and rectangular-shaped second face of the elongated, thin, slender, and rectangular-parallelepiped-shaped body of the base member further includes an obliquely-forwardly-downwardly-oriented eight multiplication table that is disposed at adjacent right of the obliquely-forwardly-downwardly-oriented seven multiplication table of the second indica on the flat, elongated, and rectangular-shaped second face of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented eight multiplication table of the second indica on the flat, elongated, and rectangular-shaped second face of the base member elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 8×0=0 to 8×12=96, inclusive, that are disposed consecutively in a column.

YET STILL ANOTHER OBJECT of the present invention is to provide a multiplication quizzer wherein each subsequent linear multiplication expression of the obliquely-forwardly-downwardly extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

YET STILL ANOTHER OBJECT of the present invention is to provide a multiplication quizzer wherein the obliquely-forwardly-downwardly-oriented seven multiplication table of the second indica on the flat, elongated, and rectangular-shaped second face of the elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 7×0=0 to 7×12=84, inclusive, that are disposed consecutively in a column.

STILL YET ANOTHER OBJECT of the present invention is to provide a multiplication quizzer wherein each subsequent linear multiplication expression of the thirteen individual linear multiplication expressions of the obliquely-forwardly-downwardly-oriented seven multiplication table of the second face indica on the flat, elongated, and rectangular-shaped second face of the elongated, thin, slender, and rectangular-parallelepiped-shaped body of the base member is disposed below, and offset slightly to right of, a directly previous linear multiplication expression of the thirteen individual linear multiplication expressions of the obliquely-forwardly-downwardly-oriented seven multiplication table of the second indica on the flat, elongated, and rectangular-shaped second face of the elongated, thin, slender, and rectangular-parallelepiped-shaped body of the base member oriented eight multiplication table of the second indica on the flat, elongated, and rectangular-shaped second face of the elongated, thin, slender, and rectangular-parallelepiped-shaped body of the base member is disposed below, and offset slightly to right of, a directly previous linear multiplication expression of the obliquely-forwardly-downwardly-oriented eight multiplication table of the second indica on the flat, elongated, and rectangular-shaped second face of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented multiplication table of the second indica on the flat, elongated, and rectangular-shaped second face of the elongated, thin, slender, and rectangular-parallelepiped-shaped body of the base member further includes an obliquely-forwardly-downwardly-oriented nine multiplication table that is disposed at adjacent right of the obliquely-forwardly-downwardly-oriented eight multiplication table of the second indica on the flat, elongated, and rectangular-shaped second face of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

YET STILL ANOTHER OBJECT of the present invention is to provide a multiplication quizzer wherein the obliquely-forwardly-downwardly-oriented nine multiplication table of the second indica on the flat, elongated, and rectangular-shaped second face of the base member elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 9×0=0 to 9×12=108, inclusive, that are disposed consecutively in a column.

STILL YET ANOTHER OBJECT of the present invention is to provide a multiplication quizzer wherein each subsequent linear multiplication expression of the obliquely-forwardly-downwardly-oriented nine multiplication table of the second indica on the flat, elongated, and rectangular-shaped second face of the elongated, thin, slender, and rectangular-parallelepiped-shaped body of the base member is disposed below, and offset slightly to right of, a directly previous linear multiplication expression of the obliquely-forwardly-downwardly-oriented nine multiplication table of the second indica on the flat, elongated, and rectangular-shaped second face of the elongated, thin, slender, and rectangular-parallelepiped-shaped body of the base member.

YET STILL ANOTHER OBJECT of the present invention is to provide a multiplication quizzer wherein the obliquely-forwardly-downwardly-oriented multiplication table of the second indica on the flat, elongated, and rectangular-shaped second face of the elongated, thin, slender, and rectangular-parallelepiped-shaped body of the base member further includes an obliquely-forwardly-downwardly-oriented ten multiplication table that is disposed at adjacent right of the obliquely-forwardly-downwardly-oriented nine multiplication table of the second indica on the flat, elongated, and rectangular-shaped second face of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented ten multiplication table of the second indica on the flat, elongated, and rectangular-shaped second face of the base member elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 10×0=0 to 10×12=120, inclusive, that are disposed consecutively in a column.

YET STILL ANOTHER OBJECT of the present invention is to provide a multiplication quizzer wherein each subsequent linear multiplication expression of the obliquely-forwardly-downwardly-oriented ten multiplication table of the second indica on the flat, elongated, and rectangular-shaped second face of the elongated, thin, slender, and rectangular-parallelepiped-shaped body of the base member is disposed below, and offset slightly to right of, a directly previous linear multiplication expression of the obliquely-forwardly-downwardly-oriented ten multiplication table of the second indica on the flat, elongated, and rectangular-shaped second face of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented multiplication table of the second indica on the flat, elongated, and rectangular-shaped second face of the elongated, thin, slender, and rectangular-parallelepiped-shaped body of the base member further includes an obliquely-forwardly-downwardly-oriented eleven multiplication table that is disposed at adjacent right of the obliquely-forwardly-downwardly-oriented ten multiplication table of the second indica on the flat, elongated, and rectangular-shaped second face of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

YET STILL ANOTHER OBJECT of the present invention is to provide a multiplication quizzer wherein the obliquely-forwardly-downwardly-oriented eleven multiplication table of the second indica on the flat, elongated, and rectangular-shaped second face of the base member elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 11×0=0 to 11×12=132, inclusive, that are disposed consecutively in a column.

STILL YET ANOTHER OBJECT of the present invention is to provide a multiplication quizzer wherein each subsequent linear multiplication expression of the obliquely-forwardly-downwardly-oriented eleven multiplication table of the second indica on the flat, elongated, and rectangular-shaped second face of the elongated, thin, slender, and rectangular-parallelepiped-shaped body of the base member is disposed below, and offset slightly to right of, a directly previous linear multiplication expression of the obliquely-forwardly-downwardly-oriented eleven multiplication table of the second indica on the flat, elongated, and rectangular-shaped second face of the elongated, thin, slender, and rectangular-parallelepiped-shaped body of the base member.

YET STILL ANOTHER OBJECT of the present invention is to provide a multiplication quizzer wherein the obliquely-forwardly-downwardly-oriented multiplication table of the second indica on the flat, elongated, and rectangular-shaped second face of the elongated, thin, slender, and rectangular-parallelepiped-shaped body of the base member further includes an obliquely-forwardly-downwardly-oriented twelve multiplication table that is disposed at adjacent right of the obliquely-forwardly-downwardly-oriented eleven multiplication table of the second indica on the flat, elongated, and rectangular-shaped second face of the elongated, thin, slender, and rectangular-parallelepiped-shaped body of the base member, and extends obliquely-forwardly-downwardly from the thin and straight upper longitudinal side of the elongated, thin, slender, and rectangular-parallelepiped-shaped body of the base member, towards the another end of the pair of thin, straight, spaced-apart, and parallel lateral ends of the elongated, thin, slender, and rectangular-parallelepiped-shaped body of the base member, to the thin and straight lower longitudinal side of the elongated, thin, slender, and rectangular-parallelepiped-shaped body of the base member.

STILL YET ANOTHER OBJECT of the present invention is to provide a multiplication quizzer wherein the obliquely-forwardly-downwardly-oriented twelve multiplication table of the second indica on the flat, elongated, and rectangular-shaped second face of the base member elongated, thin, slender, and rectangular-parallelepiped-shaped body of the base member is made up of thirteen individual linear multiplication expressions that are disposed below each other, are oriented longitudinally along the elongated, thin, slender, and rectangular-parallelepiped-shaped body of the base member, and includes linear multiplication expressions 12×0=0 to 12×12=144, inclusive, that are disposed consecutively in a column.

YET STILL ANOTHER OBJECT of the present invention is to provide a multiplication quizzer wherein each subsequent linear multiplication expression of the obliquely-forwardly-downwardly-oriented twelve multiplication table of the second indica on the flat, elongated, and rectangular-shaped second face of the elongated, thin, slender, and rectangular-parallelepiped-shaped body of the base member is disposed below, and offset slightly to right of, a directly previous linear multiplication expression of the obliquely-forwardly-downwardly-oriented twelve multiplication table of the second indica on the flat, elongated, and rectangular-shaped second face of the elongated, thin, slender, and rectangular-parallelepiped-shaped body of the base member.

STILL YET ANOTHER OBJECT of the present invention is to provide a multiplication quizzer wherein the opaque slide member is selected from the group consisting of pressboard, plastic, rubber, wood, and metal, so that the base member is of sturdy construction.

YET STILL ANOTHER OBJECT of the present invention is to provide a multiplication quizzer wherein the opaque slide member is approximately 0.625" wide, and completely encircles the base member elongated, thin, slender, and rectangular-parallelepiped-shaped body of the base member, with a wall thickness of approximately 0.0625".

STILL YET ANOTHER OBJECT of the present invention is to provide a multiplication quizzer wherein the opaque slide member has a rectangular-parallelepiped-shaped body, so that it can be easily manufactured while fully cooperating with function of the obliquely-forwardly-downwardly orientation of the at least one obliquely-forwardly-downwardly-oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member without the need for transparent portions thereon that would be necessary if the at least one obliquely-forwardly-downwardly-oriented multiplication table of the one of the first indica on the flat, (elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member were not obliquely-forwardly-downwardly oriented.

YET STILL ANOTHER OBJECT of the present invention is to provide a multiplication quizzer wherein the rectangular-parallelepiped-shaped body of the opaque slide member has a rectangular-parallelepiped-shaped throughslot that extends therethrough and slidably receives the elongated, thin, slender, and rectangular-parallelepiped-shaped body of the base member for translation thereacross.

STILL YET ANOTHER OBJECT of the present invention is to provide a multiplication quizzer wherein the rectangular-parallelepiped-shaped throughslot in the rectangular-parallelepiped-shaped body of the opaque slide member is defined by a rectangular-shaped first longitudinal portion that slidably abuts against the elongated, and rectangular-shaped first face of the elongated, thin, slender, and rectangular-parallelepiped-shaped body of the base member.

YET STILL ANOTHER OBJECT of the present invention is to provide a multiplication quizzer wherein the rectangular-parallelepiped-shaped throughslot in the rectangular-parallelepiped-shaped body of the opaque slide member is further defined by a rectangular-shaped second longitudinal portion that is parallel to, and spaced from, the rectangular-shaped first longitudinal portion of the rectangular-parallelepiped-shaped body of the opaque slide member, and slidably abuts against the flat, elongated, and rectangular-shaped second face of the elongated, thin, slender, and rectangular-parallelepiped-shaped body of the base member.

STILL YET ANOTHER OBJECT of the present invention is to provide a multiplication quizzer wherein the rectangular-parallelepiped-shaped throughslot in the rectangular-parallelepiped-shaped body of the opaque slide member is further defined by a rectangular-shaped upper lateral portion that perpendicularly connects upper ends of the rectangular-shaped first longitudinal portion of the rectangular-parallelepiped-shaped body of the opaque slide member and the rectangular-shaped second longitudinal portion of the rectangular-parallelepiped-shaped body of the opaque slide member, and slidably abuts against the thin and straight upper longitudinal side of the elongated, thin, slender, and rectangular-parallelepiped-shaped body.

YET STILL ANOTHER OBJECT of the present invention is to provide a multiplication quizzer wherein the rectangular-parallelepiped-shaped throughslot in the rectangular-parallelepiped-shaped body of the opaque slide member is further defined by a rectangular-shaped lower lateral portion that is parallel to, and spaced below, the rectangular-shaped upper lateral portion of the slide member rectangular-parallelepiped-shaped body of the opaque slide member, perpendicularly connects lower ends of the rectangular-shaped first longitudinal portion of the rectangular-parallelepiped-shaped body of the opaque slide member and the rectangular-shaped second longitudinal portion of the rectangular-parallelepiped-shaped body of the opaque slide member, and slidably abuts against the thin and straight lower longitudinal side of the elongated, thin, slender, and rectangular-parallelepiped-shaped body.

FINALLY, STILL YET ANOTHER OBJECT of the present invention is to provide a method of utilizing a multiplication quizzer to learn multiplication tables that includes the steps of determining which at least one obliquely-forwardly-downwardly oriented multiplication table of one of a first indica on a flat, elongated, and rectangular-shaped first face of an elongated, thin, slender, and rectangular-parallelepiped-shaped body of a base member and a second indica on a flat, elongated, and rectangular-shaped second face of the elongated, thin, slender, and rectangular-parallelepiped-shaped body of the base member of the multiplication quizzer is to be quizzed; sliding a rectangular-parallelepiped-shaped body of an opaque slide member of the multiplication quizzer across the elongated, thin, slender, and rectangular-parallelepiped-shaped body of the base member, with the rectangular-parallelepiped-shaped body of the opaque slide member sliding abuttingly through a rectangular-parallelepiped-shaped throughslot in the rectangular-parallelepiped-shaped body of the opaque slide member until a multiplier, an operator, and an multiplicand of a desired expression being quizzed of the obliquely-forwardly-downwardly oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member is visible, so that it can be quizzed, while a product of the desired expression being quizzed of the obliquely-forwardly-downwardly oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member is simultaneously covered and hid by the rectangular-parallelepiped-shaped body of the opaque slide member, so that it is not visible while being quizzed, and products of three directly subsequent expressions of the obliquely-forwardly-downwardly oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member yet to be quizzed are also simultaneously covered and hid by the rectangular-parallelepiped-shaped body of the opaque slide member, so that they are can not be viewed and memorized prior to being quizzed; determining the product of the desired expression of the obliquely-forwardly-downwardly oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member; sliding the rectangular-parallelepiped-shaped body of the opaque slide member slightly longitudinally to right across the elongated, thin, slender, and rectangular-parallelepiped-shaped body of the base member, with the rectangular-parallelepiped-shaped body of the opaque slide member sliding abuttingly through the rectangular-parallelepiped-shaped throughslot in the rectangular-parallelepiped-shaped body of the opaque slide member, only until the product of the desired expression being quizzed of the obliquely-forwardly-downwardly oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member is visible and a multiplier, an operator, and a multiplicand of a directly subsequent expression yet to be quizzed of the obliquely-forwardly-downwardly oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped shaped body of the base member is simultaneously visible, so that it can be subsequently quizzed, and a product of the directly subsequent expression yet to be quizzed of the obliquely-forwardly-downwardly oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member is simultaneously covered and hid by the rectangular-parallelepiped-shaped body of the opaque slide member, so that it is not visible when being subsequently quizzed; and repeating the third and fourth steps for a next directly subsequent expression, if present, of the obliquely-forwardly-downwardly oriented multiplication table of the one of the first indica on the flat, elongated, and rectangular-shaped first face of the elongated, thin, slender, and rectangular-parallelepiped-shaped body of the base member and the second indica on the flat, elongated, and rectangular-shaped second face of the elongated, thin, slender, and rectangular-parallelepiped-shaped body of the base member.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic elevational view of the present invention in use;

FIG. 4 is a cross sectional view taken on line 4—4 in FIG. 3.

Figure 2:
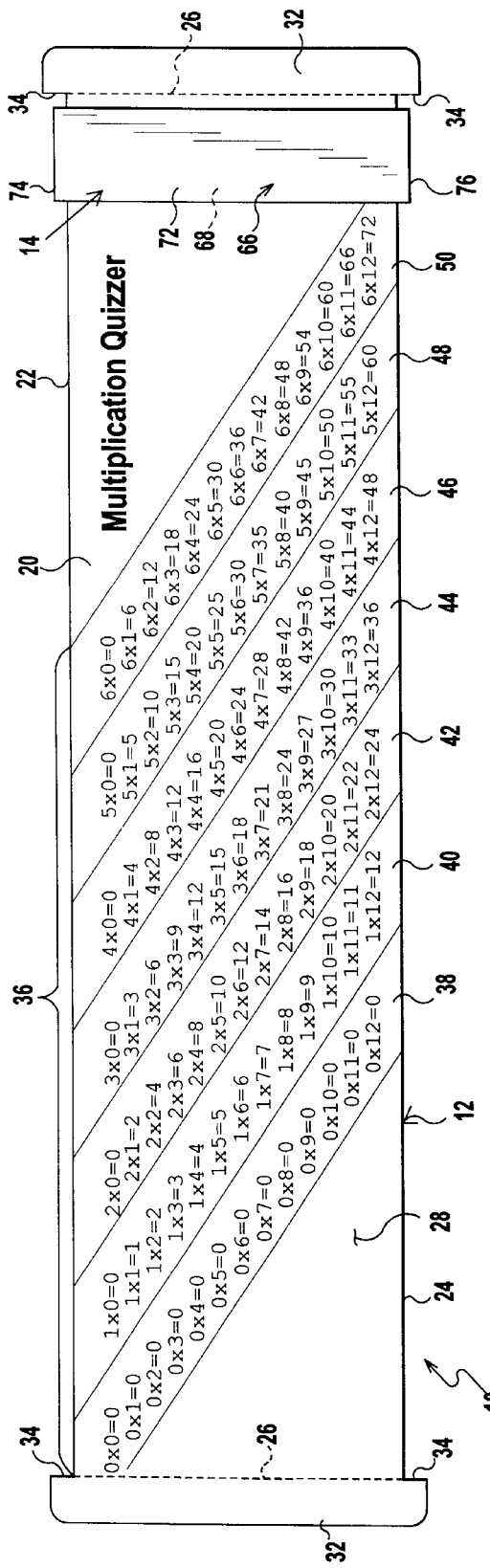
FIG. 2 is a diagrammatic elevational view of a first side of the present invention having the zero to six multiplication tables disposed thereon.

LIST OF REFERENCE NUMERALS UTILIZED IN THE DRAWING 10 multiplication quizzer of the present invention 12 base member 14 opaque slide member 16 multiplication learner hand 18 multiplication learner 20 base member elongated, thin, slender, and rectangular-parallelepiped-shaped body 22 base member body thin and straight upper longitudinal side 24 base member body thin and straight lower longitudinal side 26 base member body pair of thin, straight, spaced-apart, and parallel lateral ends 28 base member body flat, elongated, and rectangular-shaped first face 30 base member body flat, elongated, and rectangular-shaped second face 32 base member pair of slender and spaced-apart lateral end extensions 34 base member end extension stops 36 base member body first face indica 38 base member body first face indica obliquely-forwardly-downwardly-oriented zero multiplication table 40 base member body first face indica obliquely-forwardly-downwardly-oriented one multiplication table 42 base member body first face indica obliquely-forwardly-downwardly-oriented two multiplication table 44 base member body first face indica obliquely-forwardly-downwardly-oriented three multiplication table 46 base member body first face indica obliquely-forwardly-downwardly-oriented four multiplication table 48 base member body first face indica obliquely-forwardly-downwardly-oriented five multiplication table 50 base member body first face indica obliquely-forwardly-downwardly-oriented six multiplication table 52 base member body second face indica 54 base member body second face indica obliquely-forwardly-downwardly-oriented seven multiplication table 56 base member body second face indica obliquely-forwardly-downwardly-oriented eight multiplication table 58 base member body second face indica obliquely-forwardly-downwardly-oriented nine multiplication table 60 base member body second face indica obliquely-forwardly-downwardly-oriented ten multiplication table 62 base member body second face indica obliquely-forwardly-downwardly-oriented eleven multiplication table 64 base member body second face indica obliquely-forwardly-downwardly-oriented twelve multiplication table 66 slide member rectangular-parallelepiped-shaped body 68 slide member body rectangular-parallelepiped-shaped throughslot 70 slide member body rectangular-shaped first longitudinal portion 72 slide member body rectangular-shaped second longitudinal portion 74 slide member body rectangular-shaped upper lateral portion 76 slide member body rectangular-shaped lower lateral portion

DETAILED DESCRIPTION OF THE PREFERRED EMBODIMENT

Referring now to the figures in which like numerals indicate like parts, and particularly to FIG. 1, which is a diagrammatic elevational view of the present invention in use, the multiplication quizzer of the present invention is shown generally at 10 and includes a base member 12, and an opaque slide member 14 that is longitudinally slidable along the base member 12 and which is being longitudinally slid along the base member 12 by a multiplication learner hand 16 of a multiplication learner 18.

Figure 3:
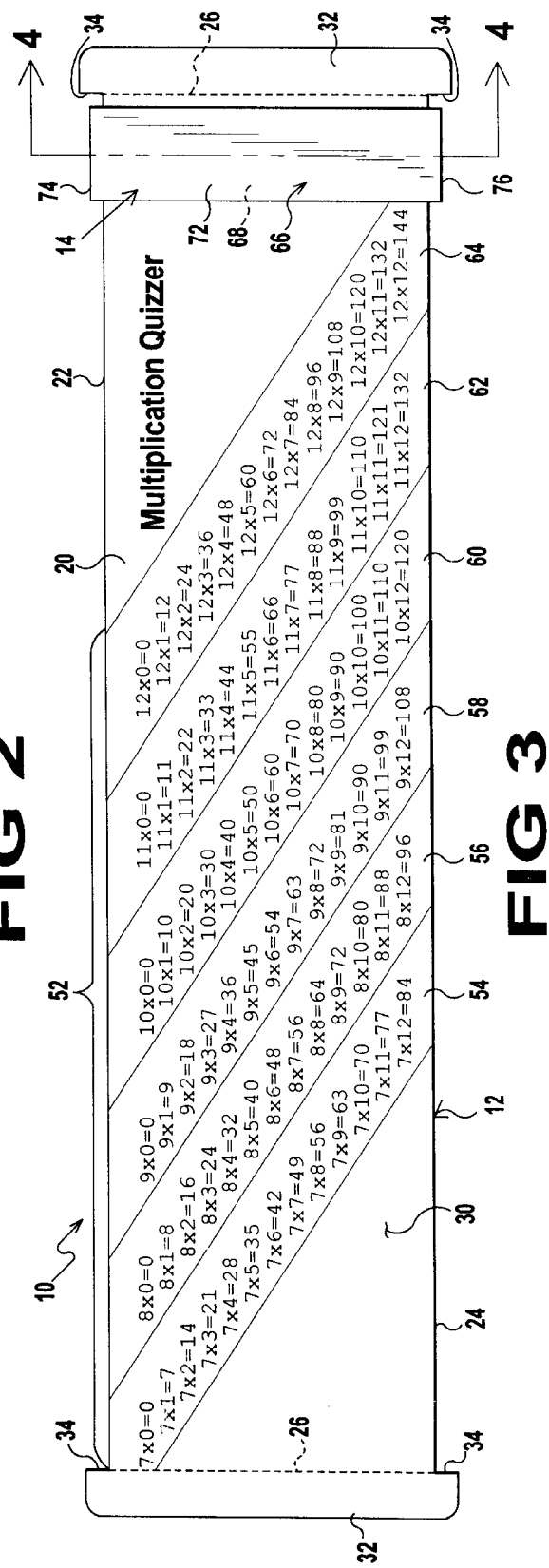
FIG. 3 is a diagrammatic elevational view of a second opposing side of the present invention having the seven to twelve multiplication tables disposed thereon.

The configuration of the base member 12 can best be seen in FIGS. 2 and 3, which are a diagrammatic elevational view of a first side of the present invention having the zero to six multiplication tables disposed thereon, and a diagrammatic elevational view of a second opposing side of the present invention having the seven to twelve multiplication tables disposed thereon, respectively, and as such will be discussed with reference thereto.

The base member 12 can be made of almost any type of material of sturdy construction, preferably, inter alia, pressboard, plastic, rubber, wood, or metal.

The base member 12 has a base member elongated, thin, slender, and rectangular-parallelepiped-shaped body 20 that is preferably 10.125" long, 0.0625" thick, and 2.25" wide.

The base member elongated, thin, slender, and rectangular-parallelepiped-shaped body 20 of the base member 12 has a base member body thin and straight upper longitudinal side 22, a base member body thin and straight lower longitudinal side 24 that is spaced below, and parallel to, the base member body thin and straight upper longitudinal side 22 of the base member elongated, thin, slender, and rectangular-parallelepiped-shaped body 20 of the base member 12.

The base member elongated, thin, slender, and rectangular-parallelepiped-shaped body 20 of the base member 12 further has a base member body pair of thin, straight, spaced-apart, and parallel lateral ends 26 that perpendicularly connect the ends of the base member body thin and straight upper longitudinal side 22 of the base member elongated, thin, slender, and rectangular-parallelepiped-shaped body 20 of the base member 12 to the respective ends of the base member body thin and straight lower longitudinal side 24 of the base member elongated, thin, slender, and rectangular-parallelepiped-shaped body 20 of the base member 12.

The base member elongated, thin, slender, and rectangular-parallelepiped-shaped body 20 of the base member 12 further has a base member body flat, elongated, and rectangular-shaped first face 28 that extends from one end of the base member body pair of thin, straight, spaced-apart, and parallel lateral ends 26 of the base member elongated, thin, slender, and rectangular-parallelepiped-shaped body 20 of the base member 12 to another end of the base member body pair of thin, straight, spaced-apart, and parallel lateral ends 26 of the base member elongated, thin, slender, and rectangular-parallelepiped-shaped body 20 of the base member 12, and from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12.

The base member elongated, thin, slender, and rectangular-parallelepiped-shaped body 20 of the base member 12 further has a base member body flat, elongated, and rectangular-shaped second face 30 that is parallel to, and spaced from, the base member body flat, elongated, and rectangular-shaped first face 28 of the base member elongated, thin, slender, and rectangular-parallelepiped-shaped body 20 of the base member 12.

The base member body flat, elongated, and rectangular-shaped second face 30 of the base member elongated, thin, slender, and rectangular-parallelepiped-shaped body 20 of the base member 12 extends from the one end of the base member body pair of thin, straight, spaced-apart, and parallel lateral ends 26 of the base member elongated, thin, slender, and rectangular-parallelepiped-shaped body 20 of the base member 12 to the another end of the base member body pair of thin, straight, spaced-apart, and parallel lateral ends 26 of the base member elongated, thin, slender, and rectangular-parallelepiped-shaped body 20 of the base member 12, and from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12.

The base member 12 further has a base member pair of slender and spaced-apart lateral end extensions 32 that are coplanar with the base member elongated, thin, slender, and rectangular-parallelepiped-shaped body 20 of the base member 12.

Each extension of the base member pair of slender and spaced-apart lateral end extensions 32 is integrally formed with a respective end of the base member body pair of thin, straight, spaced-apart, and parallel lateral ends 26 of the base member elongated, thin, slender, and rectangularparallelepiped-shaped body 20 of the base member 12, is preferably 0.375" wide, and extends perpendicularly outwardly preferably 0.125" past the base member body thin and straight upper longitudinal side 22 of the base member elongated, thin, slender, and rectangular-parallelepiped-shaped body 20 of the base member 12 and the base member body thin and straight lower longitudinal side 24 of the base member elongated, thin, slender, and rectangular-parallelepiped-shaped body 20 of the base member 12 so as to form therewith base member end extension stops 34, so that the opaque slide member 14 is prevented from sliding off the base member 12 when the slide member 14 is slid longitudinally therealong.

Disposed on the base member body flat, elongated, and rectangular-shaped first face 28 of the base member elongated, thin, slender, and rectangular-parallelepiped-shaped body 20 of the base member 12 is base member body first face indica 36.

The base member body first face indica 36 on the base member body flat, elongated, and rectangular-shaped first face 28 of the base member elongated, thin, slender, and rectangular-parallelepiped-shaped body 20 of the base member 12 is preferably printed or typed on, or imprinted into, the base member body flat, elongated, and rectangular-shaped first face 28 of the base member elongated, thin, slender, and rectangular-parallelepiped-shaped body 20 of the base member 12, so that little wear thereto is encountered.

The base member body first face indica 36 on the base member body flat, elongated, and rectangular-shaped first face 28 of the base member elongated, thin, slender, and rectangular-parallelepiped-shaped body 20 of the base member 12 includes a base member body first face indica obliquely-forwardly-downwardly-oriented zero multiplication table 38, a base member body first face indica obliquely-forwardly-downwardly-oriented one multiplication table 40, a base member body first face indica obliquely-forwardly-downwardly-oriented two multiplication table 42, a base member body first face indica obliquely-forwardly-downwardly-oriented three multiplication table 44, a base member body first face indica obliquely-forwardly-downwardly-oriented four multiplication table 46, a base member body first face indica obliquely-forwardly-downwardly-oriented five multiplication table 48, and a base member body first face indica obliquely-forwardly-downwardly-oriented six multiplication table 50.

It is to be understood that any multiplication tables can be used for the base member body first face indica 36 on the base member body flat, elongated, and rectangular-shaped first face 28 of the base member elongated, thin, slender, and rectangular-parallelepiped-shaped body 20 of the base member 12 without departing in any way from the spirit of the present invention, so long as they are obliquely-forwardly-downwardly-oriented as discussed, infra.

The base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangular-parallelepiped-shaped body 20 of the base member 12 originates at the one end of the base member body pair of thin, straight, spaced-apart, and parallel lateral ends 26 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions 0×0=0 to 0×12=0 that are disposed consecutively in a column.

Each subsequent linear multiplication expression of the thirteen individual linear multiplication expressions of the base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangular-parallelepiped-shaped body 20 of the base member 12, and the products of the three subsequent linear multiplication expression of the thirteen individual linear multiplication expressions of the base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangularparallelepiped-shaped body 20 of the base member 12 are also covered by the opaque slide member 14 and thereby hiding them from view making it impossible to determine and memorize the products of the three subsequent multiplication linear expressions of the thirteen individual linear multiplication expressions of the base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body first face indica obliquely-forwardly-downwardly-oriented zero multiplication table 38 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangular-parallelepiped-shaped body 20 of the base member 12, without covering up the multipliers of the subsequent linear multiplication expression of the thirteen individual linear multiplication expressions of the base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangular-parallelepiped-shaped body 20 of the base member 12 yet to be quizzed.

The base member body first face indica obliquely-forwardly-downwardly-oriented one multiplication table 40 of the base member body first face indica 36 on the base member body flat, elongated, and rectangular-shaped first face 28 of the base member elongated, thin, slender, and rectangular-parallelepiped-shaped body 20 of the base member 12 is disposed at the adjacent right of the base member body first face indica obliquely-forwardly-downwardly-oriented zero multiplication table 38 of the base member body first face indica 36 on the base member body flat, elongated, and rectangular-shaped first face 28 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body first face indica obliquely-forwardly-downwardly-oriented one multiplication table 40 of the base member body first face indica 36 on the base member body flat, elongated, and rectangular-shaped first face 28 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions 1×0=0 to 1×12=12 that are disposed consecutively in a column.

Each subsequent linear multiplication expression of the thirteen individual linear multiplication expressions of the base member body first face indica obliquely-forwardly-downwardly-oriented one multiplication table 40 of the base member body first face indica 36 on the base member body flat, elongated, and rectangular-shaped first face 28 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body first face indica obliquely-forwardly-downwardly-oriented one multiplication table 38 of the base member body first face indica 36 on the base member body flat, elongated, and rectangular-shaped first face 28 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body first face indica obliquely-forwardly-downwardly-oriented one multiplication table 40 of the base member body first face indica 36 on the base member body flat, elongated, and rectangular-shaped first face 28 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body first face indica obliquely-forwardly-downwardly-oriented one multiplication table 40 of the base member body first face indica 36 on the base member body flat, elongated, and rectangular-shaped first face 28 of the base member elongated, thin, slender, and rectangular-parallelepiped-shaped body 20 of the base member 12, the products of the three subsequent linear multiplication expressions of the thirteen individual linear multiplication expressions of the base member body first face indica obliquely-forwardly-downwardly-oriented one multiplication table 40 of the base member body first face indica 36 on the base member body flat, elongated, and rectangular-shaped first face 28 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expressions of the thirteen individual linear multiplication expressions of the base member body first face indica obliquely-forwardly-downwardly-oriented one multiplication table 40 of the base member body first face indica 36 on the base member body flat, elongated, and rectangular-shaped first face 28 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body first face indica obliquely-forwardly-downwardly-oriented one multiplication table 40 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body first face indica obliquely-forwardly-downwardly-oriented one multiplication table 40 of the base member body first face indica 36 on the base member body flat, elongated, and rectangular-shaped first face 28 of the base member elongated, thin, slender, and rectangular-parallelepiped-shaped body 20 of the base member 12, without covering up the multipliers of the subsequent linear multiplication expression of the thirteen individual linear multiplication expressions of the base member body first face indica obliquely-forwardly-downwardly-oriented one multiplication table 40 of the base member body first face indica 36 on the base member body flat, elongated, and rectangular-shaped first face 28 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body first face indica obliquely-forwardly-downwardly-oriented one multiplication table 40 of the base member body first face indica 36 on the base member body flat, elongated, and rectangular-shaped first face 28 of the base member elongated, thin, slender, and rectangular-parallelepiped-shaped body 20 of the base member 12 yet to be quizzed.

The base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12 is disposed at the adjacent right of the base member body first face indica obliquely-forwardly-downwardly-oriented one multiplication table 40 of the base member body first face indica 36 on the base member body flat, elongated, and rectangular-shaped first face 28 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions $2 \times 0 = 0$ to $2 \times 12 = 24$ that are disposed consecutively in a column.

Each subsequent linear multiplication expression of the thirteen individual linear multiplication expressions of the base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12, the products of the three subsequent linear multiplication expressions of the thirteen individual linear multiplication expressions of the base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expressions of the thirteen individual linear multiplication expressions of the base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body first face indica obliquely-forwardly-downwardly-oriented two multiplication table 42 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12, without covering up the multipliers of the subsequent linear multiplication expression of the thirteen individual linear multiplication expressions of the base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12 yet to be quizzed.

The base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12 is disposed at the adjacent right of the base member body first face indica obliquely-forwardly-downwardly-oriented two multiplication table 42 of the base member body first face indica 36 on the base member body flat, elongated, and rectangular-shaped first face 28 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions 3×0=0 to 3×12=36 that are disposed consecutively in a column.

Each subsequent linear multiplication expression of the thirteen individual linear multiplication expressions of the base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12, the products of the three subsequent linear multiplication expressions of the thirteen individual linear multiplication expressions of the base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expression of the thirteen individual linear multiplication expressions of the base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body first face indica obliquely-forwardly-downwardly-oriented three multiplication table 44 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expression of the base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12, without covering up the multipliers of the subsequent linear multiplication expression of the thirteen individual linear multiplication expressions of the base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12 yet to be quizzed.

The base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12 is disposed at the adjacent right of the base member body first face indica obliquely-forwardly-downwardly-oriented three multiplication table 44 of the base member body first face indica 36 on the base member body flat, elongated, and rectangular-shaped first face 28 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions 4×0=0 to 4×12=48 that are disposed consecutively in a column.

Each subsequent linear multiplication expression of the thirteen individual linear multiplication expressions of the base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12, the products of the three subsequent linear multiplication expressions of the thirteen individual linear multiplication expressions of the base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expressions of the thirteen individual linear multiplication expressions of the base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body first face indica obliquely-forwardly-downwardly-oriented four multiplication table 46 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12, without covering up the multipliers of the subsequent linear multiplication expression of the thirteen individual linear multiplication expressions of the base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12 yet to be quizzed.

The base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12 is disposed at the adjacent right of the base member body first face indica obliquely-forwardly-downwardly-oriented four multiplication table 46 of the base member body first face indica 36 on the base member body flat, elongated, and rectangular-shaped first face 28 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body first face indica obliquely-forwardly downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions 5×0=0 to 5×12=60 that are disposed consecutively in a column.

Each subsequent linear multiplication expression of the thirteen individual linear multiplication expressions of the base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12, the products of the three subsequent linear multiplication expressions of the thirteen individual linear multiplication expressions of the base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expressions of the thirteen individual linear multiplication expressions of the base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepipedshaped body 20 of the base member 12 before they are quizzed, until the opaque slide member 14 is intentionally slid longitudinally thereaway.

It is important to understand that by having the base member body first face indica obliquely-forwardly-downwardly-oriented five multiplication table 48 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12, without covering up the multipliers of the subsequent linear multiplication expression of the thirteen individual linear multiplication expressions of the base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12 yet to be quizzed.

The base member body first face indica obliquely-forwardly-downwardly-oriented six multiplication table 50 of the base member body first face indica 36 on the base member body flat, elongated, and rectangular-shaped first face 28 of the base member elongated, thin, slender, and rectangular-parallelepiped-shaped body 20 of the base member 12 is disposed at the adjacent right of the base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body first face indica obliquely-forwardly-downwardly-oriented six multiplication table 50 of the base member body first face indica 36 on the base member body flat, elongated, and rectangular-shaped first face 28 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions 6×0=0 to 6×12=72 that are disposed consecutively in a column.

Each subsequent linear multiplication expression of the thirteen individual linear multiplication expressions of the base member body first face indica obliquely-forwardly-downwardly-oriented six multiplication table 50 of the base member body first face indica 36 on the base member body flat, elongated, and rectangular-shaped first face 28 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body first face indica obliquely-forwardly-downwardly-oriented six multiplication table 50 of the base member body first face indica 36 on the base member body flat, elongated, and rectangular-shaped first face 28 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body first face indica obliquely-forwardly-downwardly-oriented six multiplication table 50 of the base member body first face indica 36 on the base member body flat, elongated, and rectangular-shaped first face 28 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body first face indica obliquely-forwardly-downwardly-oriented six multiplication table 50 of the base member body first face indica 36 on the base member body flat, elongated, and rectangular-shaped first face 28 of the base member elongated, thin, slender, and rectangular-parallelepiped-shaped body 20 of the base member 12, the products of the three subsequent linear multiplication expressions of the thirteen individual linear multiplication expressions of the base member body first face indica obliquely-forwardly-downwardly-oriented six multiplication table 50 of the base member body first face indica 36 on the base member body flat, elongated, and rectangular-shaped first face 28 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expressions of the thirteen individual linear multiplication expressions of the base member body first face indica obliquely-forwardly-downwardly-oriented six multiplication table 50 of the base member body first face indica 36 on the base member body flat, elongated, and rectangular-shaped first face 28 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body first face indica obliquely-forwardly-downwardly-oriented six multiplication table 50 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body first face indica obliquely-forwardly-downwardly-oriented six multiplication table 50 of the base member body first face indica 36 on the base member body flat, elongated, and rectangular-shaped first face 28 of the base member elongated, thin, slender, and rectangular-parallelepiped-shaped body 20 of the base member 12, without covering up the multipliers of the subsequent linear multiplication expression of the thirteen individual linear multiplication expressions of the base member body first face indica obliquely-forwardly-downwardly-oriented six multiplication table 50 of the base member body first face indica 36 on the base member body flat, elongated, and rectangular-shaped first face 28 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body first face indica obliquely-forwardly-downwardly-oriented six multiplication table 50 of the base member body first face indica 36 on the base member body flat, elongated, and rectangular-shaped first face 28 of the base member elongated, thin, slender, and rectangular-parallelepiped-shaped body 20 of the base member 12 yet to be quizzed.

Disposed on the base member body flat, elongated, and rectangular-shaped second face 30 of the base member elongated, thin, slender, and rectangular-parallelepiped-shaped body 20 of the base member 12 is base member body second face indica 52.

The base member body second face indica 52 on the base member body flat, elongated, and rectangular-shaped second face 30 of the base member elongated, thin, slender, and rectangular-parallelepiped-shaped body 20 of the base member 12 is preferably printed or typed on, or imprinted into, the base member body flat, elongated, and rectangular-shaped second face 30 of the base member elongated, thin, slender, and rectangular-parallelepiped-shaped body 20 of the base member 12, so that little wear thereto is encountered.

The base member body second face indica 52 on the base member body flat, elongated, and rectangular-shaped second face 30 of the base member elongated, thin, slender, and rectangular-parallelepiped-shaped body 20 of the base member 12 includes a base member body second face indica obliquely-forwardly-downwardly-oriented seven multiplication table 54, a base member body second face indica obliquely-forwardly-downwardly-oriented eight multiplication table 56, a base member body second face indica obliquely-forwardly-downwardly-oriented nine multiplication table 58, a base member body second face indica obliquely-forwardly-downwardly-oriented ten multiplication table 60, a base member body second face indica obliquely-forwardly-downwardly-oriented eleven multiplication table 62, and a base member body second face indica obliquely-forwardly-downwardly-oriented twelve multiplication table 64.

It is to be understood that any multiplication tables can be used for the base member body second face indica 52 on the base member body flat, elongated, and rectangular-shaped second face 30 of the base member elongated, thin, slender, and rectangular-parallelepiped-shaped body 20 of the base member 12 without departing in any way from the spirit of the present invention, so long as they are obliquely-forwardly-downwardly-oriented as discussed, infra.

The base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12 originates at the one end of the base member body pair of thin, straight, spaced-apart, and parallel lateral ends 26 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions 7×0=0 to 7×12=84 that are disposed consecutively in a column.

Each subsequent linear multiplication expression of the thirteen individual linear multiplication expressions of the base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12, the products of the three subsequent linear multiplication expressions of the thirteen individual linear multiplication expressions of the base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expressions of the thirteen individual linear multiplication expressions of the base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body second face indica obliquely-forwardly-downwardly-oriented seven multiplication table 54 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12, without covering up the multipliers of the subsequent linear multiplication expression of the thirteen individual linear multiplication expressions of the base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12 yet to be quizzed.

The base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12 is disposed at the adjacent right of the base member body second face indica obliquely-forwardly-downwardly-oriented seven multiplication table 54 of the base member body second face indica 52 on the base member body flat, elongated, and rectangular-shaped second face 30 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions 8×0=0 to 8×12=96 that are disposed consecutively in a column.

Each subsequent linear multiplication expression of the thirteen individual linear multiplication expressions of the base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12, the products of the three subsequent linear multiplication expressions of the thirteen individual linear multiplication expressions of the base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expressions of the thirteen individual linear multiplication expressions of the base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body second face indica obliquely-forwardly-downwardly-oriented eight multiplication table 56 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12, without covering up the multipliers of the subsequent linear multiplication expression of the thirteen individual linear multiplication expressions of the base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12 yet to be quizzed.

The base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12 is disposed at the adjacent right of the base member body second face indica obliquely-forwardly-downwardly-oriented eight multiplication table 56 of the base member body second face indica 52 on the base member body flat, elongated, and rectangular-shaped second face 30 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions $9 \times 0 = 0$ to $9 \times 12 = 108$ that are disposed consecutively in a column.

Each subsequent linear multiplication expression of the thirteen individual linear multiplication expressions of the base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12, the products of the three subsequent linear multiplication expressions of the thirteen individual linear multiplication expressions of the base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expressions of the thirteen individual linear multiplication expressions of the base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body second face indica obliquely-forwardly-downwardly-oriented nine multiplication table 58 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12, without covering up the multipliers of the subsequent linear multiplication expression of the thirteen individual linear multiplication expressions of the base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12 yet to be tested, but covering up the product of the subsequent linear multiplication expression of the thirteen individual linear multiplication expressions of the base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12 yet to be quizzed.

The base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12 is disposed at the adjacent right of the base member body second face indica obliquely-forwardly-downwardly-oriented nine multiplication table 58 of the base member body second face indica 52 on the base member body flat, elongated, and rectangular-shaped second face 30 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions 10×0=0 to 10×12=120 that are disposed consecutively in a column.

Each subsequent linear multiplication expression of the thirteen individual linear multiplication expressions of the base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12, the products of the three subsequent linear multiplication expressions of the thirteen individual linear multiplication expressions of the base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expressions of the thirteen individual linear multiplication expressions of the base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body second face indica obliquely-forwardly-downwardly-oriented ten multiplication table 60 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12, without covering up the multipliers of the subsequent linear multiplication expression of the thirteen individual linear multiplication expressions of the base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12 yet to be quizzed.

The base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12 is disposed at the adjacent right of the base member body second face indica obliquely-forwardly-downwardly-oriented ten multiplication table 60 of the base member body second face indica 52 on the base member body flat, elongated, and rectangular-shaped second face 30 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions 11×0=0 to 11×12=132 that are disposed consecutively in a column.

Each subsequent linear multiplication expression of the thirteen individual linear multiplication expressions of the base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12, the products of the three subsequent linear multiplication expressions of the thirteen individual linear multiplication expressions of the base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expression of the thirteen individual linear multiplication expressions of the base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body second face indica obliquely-forwardly-downwardly-oriented eleven multiplication table 62 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12, without covering up the multipliers of the subsequent linear multiplication expression of the thirteen individual linear multiplication expressions of the base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12 yet to be quizzed.

The base member body second face indica obliquely-forwardly-downwardly-oriented twelve multiplication table 64 of the base member body second face indica 52 on the base member body flat, elongated, and rectangular-shaped second face 30 of the base member elongated, thin, slender, and rectangular-parallelepiped-shaped body 20 of the base member 12 is disposed at the adjacent right of the base member body second face indica obliquely-forwardly-downwardly-oriented eleven multiplication table 62 of the base member body second face indica 52 on the base member body flat, elongated, and rectangular-shaped second face 30 of the base member elongated, thin, slender, and rectangular-parallelepiped-shaped body 20 of the base member 12, and extends obliquely-forwardly-downwardly from the base member body thin and straight upper longitudinal side 22 of the base member elongated, thin, slender, and rectangular-parallelepiped-shaped body 20 of the base member 12, towards the another end of the base member body pair of thin, straight, spaced-apart, and parallel lateral ends 26 of the base member elongated, thin, slender, and rectangular-parallelepiped-shaped body 20 of the base member 12, to the base member body thin and straight lower longitudinal side 24 of the base member elongated, thin, slender, and rectangular-parallelepiped-shaped body 20 of the base member 12.

The base member body second face indica obliquely-forwardly-downwardly-oriented twelve multiplication table 64 of the base member body second face indica 52 on the base member body flat, elongated, and rectangular-shaped second face 30 of the base member elongated, thin, slender, and rectangular-parallelepiped-shaped body 20 of the base member 12 is made up of thirteen individual linear multiplication expressions that are disposed below each other, are oriented longitudinally along the base member elongated, thin, slender, and rectangular-parallelepiped-shaped body 20 of the base member 12, and includes the linear multiplication expressions 12×0=0 to 12×12=144 that are disposed consecutively in a column.

Each subsequent linear multiplication expression of the thirteen individual linear multiplication expressions of the base member body second face indica obliquely-forwardly-downwardly-oriented twelve multiplication table 64 of the base member body second face indica 52 on the base member body flat, elongated, and rectangular-shaped second face 30 of the base member elongated, thin, slender, and rectangular-parallelepiped-shaped body 20 of the base member 12 is disposed below, and offset slightly to the right of, the previous linear multiplication expression of the thirteen individual linear multiplication expressions of the base member body second face indica obliquely-forwardly-downwardly-oriented twelve multiplication table 64 of the base member body second face indica 52 on the base member body flat, elongated, and rectangular-shaped second face 30 of the base member elongated, thin, slender, and rectangular-parallelepiped-shaped body 20 of the base member 12, so that when the opaque slide member 14 intentionally slides over and covers the product of one linear multiplication expression of the thirteen individual linear multiplication expressions of the base member body second face indica obliquely-forwardly-downwardly-oriented twelve multiplication table 64 of the base member body second face indica 52 on the base member body flat, elongated, and rectangular-shaped second face 30 of the base member elongated, thin, slender, and rectangular-parallelepiped-shaped body 20 of the base member 12 and thereby hiding it from view and making it impossible to determine the product of the one linear multiplication expression of the thirteen individual linear multiplication expressions of the base member body second face indica obliquely-forwardly-downwardly-oriented twelve multiplication table 64 of the base member body second face indica 52 on the base member body flat, elongated, and rectangular-shaped second face 30 of the base member elongated, thin, slender, and rectangular-parallelepiped-shaped body 20 of the base member 12, the products of the three subsequent linear multiplication expressions of the thirteen individual linear multiplication expressions of the base member body second face indica obliquely-forwardly-downwardly-oriented twelve multiplication table 64 of the base member body second face indica 52 on the base member body flat, elongated, and rectangular-shaped second face 30 of the base member elongated, thin, slender, and rectangular-parallelepiped-shaped body 20 of the base member 12 are also covered by the opaque slide member 14 and thereby hiding them from view making it impossible to determine and memorize the products of the three subsequent multiplication linear expressions of the thirteen individual linear multiplication expressions of the base member body second face indica obliquely-forwardly-downwardly-oriented twelve multiplication table 64 of the base member body second face indica 52 on the base member body flat, elongated, and rectangular-shaped second face 30 of the base member elongated, thin, slender, and rectangular-parallelepiped-shaped body 20 of the base member 12 before they are quizzed, until the opaque slide member 14 is intentionally slid longitudinally thereaway.

It is important to understand that by having the base member body second face indica obliquely-forwardly-downwardly-oriented twelve multiplication table 64 extending obliquely-forwardly-downwardly from the base member body thin and straight upper longitudinal side 22 of the base member elongated, thin, slender, and rectangular-parallelepiped-shaped body 20 of the base member 12 to the base member body thin and straight lower longitudinal side 24 of the base member elongated, thin, slender, and rectangular-parallelepiped-shaped body 20 of the base member 12, the opaque slide member 14 can be intentionally slid to the right exposing the product of the one linear multiplication expression of the thirteen individual linear multiplication expressions of the base member body second face indica obliquely-forwardly-downwardly-oriented twelve multiplication table 64 of the base member body second face indica 52 on the base member body flat, elongated, and rectangular-shaped second face 30 of the base member elongated, thin, slender, and rectangular-parallelepiped-shaped body 20 of the base member 12, without covering up the multipliers of the subsequent linear multiplication expression of the thirteen individual linear multiplication expressions of the base member body second face indica obliquely-forwardly-downwardly-oriented twelve multiplication table 64 of the base member body second face indica 52 on the base member body flat, elongated, and rectangular-shaped second face 30 of the base member elongated, thin, slender, and rectangular-parallelepiped-shaped body 20 of the base member 12 yet to be quizzed, but covering up the product of the subsequent linear multiplication expression of the thirteen individual linear multiplication expressions of the base member body second face indica obliquely-forwardly-downwardly-oriented twelve multiplication table 64 of the base member body second face indica 52 on the base member body flat, elongated, and rectangular-shaped second face 30 of the base member elongated, thin, slender, and rectangular-parallelepiped-shaped body 20 of the base member 12 yet to be quizzed.

The configuration of the opaque slide member 14 can best be seen in FIGS. 2–4, which are a diagrammatic elevational view of a first side of the present invention having the zero to six multiplication tables disposed thereon, a diagrammatic elevational view of a second opposing side of the present invention having the seven to twelve multiplication tables disposed thereon, and a cross sectional view taken on line 4—4 in FIG. 3, respectively, and as such will be discussed with reference thereto.

The opaque slide member 14 can be made of almost any type of material of sturdy construction, preferably, inter alia, pressboard, plastic, rubber, wood, or metal, is 0.625" wide, and completely encircles the base member elongated, thin, slender, and rectangular-parallelepiped-shaped body 20 of the base member 12, with a wall thickness of 0.0625".

The opaque slide member 14 has a slide member rectangular-parallelepiped-shaped body 66 with a slide member body rectangular-parallelepiped-shaped throughslot 68 that extends therethrough and slidably receives the base member elongated, thin, slender, and rectangular-parallelepiped-shaped body 20 of the base member 12 for translation thereacross.

The slide member body rectangular-parallelepiped-shaped throughslot 68 in the slide member rectangular-parallelepiped-shaped body 66 of the opaque slide member 14 is defined by a slide member body rectangular-shaped first longitudinal portion 70 that slidably abuts against the base member body flat, elongated, and rectangular-shaped first face 28 of the base member elongated, thin, slender, and rectangular-parallelepiped-shaped body 20 of the base member 12.

The slide member body rectangular-parallelepiped-shaped throughslot 68 in the slide member rectangular-parallelepiped-shaped body 66 of the opaque slide member 14 is further defined by a slide member body rectangular-shaped second longitudinal portion 72 that is parallel to, and spaced from, the slide member body rectangular-shaped first longitudinal portion 70 of the slide member rectangular-parallelepiped-shaped body 66 of the opaque slide member 14, and slidably abuts against the base member body flat, elongated, and rectangular-shaped second face 30 of the base member elongated, thin, slender, and rectangular-parallelepiped-shaped body 20 of the base member 12.

The slide member body rectangular-parallelepiped-shaped throughslot 68 in the slide member rectangular-parallelepiped-shaped body 66 of the opaque slide member 14 is further defined by a slide member body rectangular-shaped upper lateral portion 74 that perpendicularly connects upper ends of the slide member body rectangular-shaped first longitudinal portion 70 of the slide member rectangular-parallelepiped-shaped body 66 of the opaque slide member 14 and the slide member body rectangular-shaped second longitudinal portion 72 of the slide member rectangular-parallelepiped-shaped body 66 of the opaque slide member 14, and slidably abuts against the base member body thin and straight upper longitudinal side 22 of the base member elongated, thin, slender, and rectangular-parallelepiped-shaped body 20 of the base member 12.

The slide member body rectangular-parallelepiped-shaped throughslot 68 in the slide member rectangularparallelepiped-shaped body 66 of the opaque slide member 14 is further defined by a slide member body rectangular-shaped lower lateral portion 76 that is parallel to, and spaced below, the slide member body rectangular-shaped upper lateral portion 74 of the slide member rectangular-parallelepiped-shaped body 66 of the opaque slide member 14, perpendicularly connects lower ends of the slide member body rectangular-shaped first longitudinal portion 70 of the slide member rectangular-parallelepiped-shaped body 66 of the opaque slide member 14 and the slide member body rectangular-shaped second longitudinal portion 72 of the slide member rectangular-parallelepiped-shaped body 66 of the opaque slide member 14, and slidably abuts against the base member body thin and straight lower longitudinal side 24 of the base member elongated, thin, slender, and rectangular-parallelepiped-shaped body 20 of the base member 12.

It is to be understood that the rectangular-parallelepiped shape of the slide member rectangular-parallelepiped-shaped body 66 of the opaque slide member 14 allows for easy manufacture thereof, while fully cooperating with the function of the obliquely-forwardly-downwardly orientations of the base member body first face indica 36 on the base member body flat, elongated, and rectangular-shaped first face 28 of the base member elongated, thin, slender, and rectangular-parallelepiped-shaped body 20 of the base member 12 and the base member body second face indica 52 on the base member body flat, elongated, and rectangular-shaped second face 30 of the base member elongated, thin, slender, and rectangular-parallelepiped-shaped body 20 of the base member 12, without the need for transparent portions thereon that would be necessary if the base member body first face indica 36 on the base member body flat, elongated, and rectangular-shaped first face 28 of the base member elongated, thin, slender, and rectangular-parallelepiped-shaped body 20 of the base member 12 and the base member body second face indica 52 on the base member body flat, elongated, and rectangular-shaped second face 30 of the base member elongated, thin, slender, and rectangular-parallelepiped-shaped body 20 of the base member 12 were not obliquely-forwardly-downwardly oriented.

The method of utilizing the multiplication quizzer 10 can best be seen in FIG. 1, which is a diagrammatic elevational view of the present invention in use, and as such will be discussed with reference thereto.

It is to be understood that the method of utilizing the multiplication quizzer 10 to quiz the base member body first face indica obliquely-forwardly-downwardly-oriented five multiplication table 48 of the base member body first face indica 36 on the base member body flat, elongated, and rectangular-shaped first face 28 of the base member elongated, thin, slender, and rectangular-parallelepiped-shaped body 20 of the base member 12 shown in FIG. 1 is for illustration purposes only, and that the multiplication quizzer 10 is utilized in the same general fashion to quiz the remaining multiplication tables thereon.

STEP 1: Determine which obliquely-forwardly-downwardly oriented multiplication table of the base member body first face indica 36 on the base member body flat, elongated, and rectangular-shaped first face 28 of the base member elongated, thin, slender, and rectangular-parallelepiped-shaped body 20 of the base member 12 and the base member body second face indica 52 on the base member body flat, elongated, and rectangular-shaped second face 30 of the base member elongated, thin, slender, and rectangular-parallelepiped-shaped body 20 of the base member 12 is to be quizzed.

STEP 2: Slide the slide member rectangular-parallelepiped-shaped body 66 of the opaque slide member 14 longitudinally across the base member elongated, thin, slender, and rectangular-parallelepiped-shaped body 20 of the base member 12, with the slide member rectangular-parallelepiped-shaped body 66 of the opaque slide member 14 sliding through the slide member body rectangular-parallelepiped-shaped throughslot 68 in the slide member rectangular-parallelepiped-shaped body 66 of the opaque slide member 14, until the product of the desired expression of the desired obliquely-forwardly-downwardly oriented multiplication table of the base member body first face indica 36 on the base member body flat, elongated, and rectangular-shaped first face 28 of the base member elongated, thin, slender, and rectangular-parallelepiped-shaped body 20 of the base member 12 or the base member body second face indica 52 on the base member body flat, elongated, and rectangular-shaped second face 30 of the base member elongated, thin, slender, and rectangular-parallelepiped-shaped body 20 of the base member 12 to be quizzed and the products of three subsequent expression of the desired obliquely-forwardly-downwardly oriented multiplication table of the base member body first face indica 36 on the base member body flat, elongated, and rectangular-shaped first face 28 of the base member elongated, thin, slender, and rectangular-parallelepiped-shaped body 20 of the base member 12 or the base member body second face indica 52 on the base member body flat, elongated, and rectangular-shaped second face 30 of the base member elongated, thin, slender, and rectangular-parallelepiped-shaped body 20 of the base member 12 are covered by the slide member rectangular-parallelepiped-shaped body 66 of the opaque slide member 14, and with the multiplier, the operator, and the multiplicand of the same desired expression of the same desired obliquely-forwardly-downwardly oriented multiplication table of the base member body first face indica 36 on the base member body flat, elongated, and rectangular-shaped first face 28 of the base member elongated, thin, slender, and rectangular-parallelepiped-shaped body 20 of the base member 12 or the base member body second face indica 52 on the base member body flat, elongated, and rectangular-shaped second face 30 of the base member elongated, thin, slender, and rectangular-parallelepiped-shaped body 20 of the base member 12 being visible.

STEP 3: Determine the product of the same desired expression of the same desired obliquely-forwardly-downwardly oriented multiplication table of the base member body first face indica 36 on the base member body flat, elongated, and rectangular-shaped first face 28 of the base member elongated, thin, slender, and rectangular-parallelepiped-shaped body 20 of the base member 12 or the base member body second face indica 52 on the base member body flat, elongated, and rectangular-shaped second face 30 of the base member elongated, thin, slender, and rectangular-parallelepiped-shaped body 20 of the base member 12.

STEP 4: Slide the slide member rectangular-parallelepiped-shaped body 66 of the opaque slide member 14 slightly longitudinally to the right across the base member elongated, thin, slender, and rectangular-parallelepiped-shaped body 20 of the base member 12, with the slide member rectangular-parallelepiped-shaped body 66 of the opaque slide member 14 sliding through the slide member body rectangular-parallelepiped-shaped throughslot 68 in the slide member rectangular-parallelepiped-shaped body 66 of the opaque slide member 14, only until the product of the same desired expression of the same desired obliquely-forwardly-downwardly oriented multiplication table of the base member body first face indica 36 on the base member body flat, elongated, and rectangular-shaped first face 28 of the base member elongated, thin, slender, and rectangular-parallelepiped-shaped body 20 of the base member 12 or the base member body second face indica 52 on the base member body flat, elongated, and rectangular-shaped second face 30 of the base member elongated, thin, slender, and rectangular-parallelepiped-shaped body 20 of the base member 12 is visible and the products of the subsequent three expressions of the same desired obliquely-forwardly-downwardly oriented multiplication table of the base member body first face indica 36 on the base member body flat, elongated, and rectangular-shaped first face 28 of the base member elongated, thin, slender, and rectangular-parallelepiped-shaped body 20 of the base member 12 or the base member body second face indica 52 on the base member body flat, elongated, and rectangular-shaped second face 30 of the base member elongated, thin, slender, and rectangular-parallelepiped-shaped body 20 of the base member 12 are covered by the slide member rectangular-parallelepiped-shaped body 66 of the opaque slide member 14.

STEP 5: Repeat STEP 3 and STEP 4, supra, for the subsequent expression of the same desired obliquely-forwardly-downwardly oriented multiplication table of the base member body first face indica 36 on the base member body flat, elongated, and rectangular-shaped first face 28 of the base member elongated, thin, slender, and rectangular-parallelepiped-shaped body 20 of the base member 12 or the base member body second face indica 52 on the base member body flat, elongated, and rectangular-shaped second face 30 of the base member elongated, thin, slender, and rectangular-parallelepiped-shaped body 20 of the base member 12.

It is to be understood that the orientation of the base member body first face indica 36 on the base member body flat, elongated, and rectangular-shaped first face 28 of the base member elongated, thin, slender, and rectangular-parallelepiped-shaped body 20 of the base member 12, the orientation of the base member body second face indica 52 on the base member body flat, elongated, and rectangular-shaped second face 30 of the base member elongated, thin, slender, and rectangular-parallelepiped-shaped body 20 of the base member 12, and the configuration of the opaque slide member 14 are not merely a matter of design choice but are significant and of critical importance for, inter alia, the functions that they accomplish as discussed, supra, and any not explicitly expressed but inherent thereto.

It will be understood that each of the elements described above, or two or more together, may also find a useful application in other types of constructions differing from the types described above.

While the invention has been illustrated and described as embodied in a multiplication quizzer, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

It is claimed:
1. A multiplication quizzer, comprising:
a) a base member having an elongated, thin, slender, and rectangular-parallelepiped-shaped body with a flat, elongated, and rectangular-shaped first face and a flat, elongated, and rectangular-shaped second face parallel to, and spaced from, said flat, elongated, and rectangular-shaped first face of said elongated, thin, slender, and rectangular-parallelepiped-shaped body of said base member;
b) first indicia disposed on said flat, elongated, and rectangular-shaped first face of said elongated, thin, slender, and rectangular-parallelepiped-shaped body of said base member; said first indicia on said flat, elongated, and rectangular-shaped first face of said elongated, thin, slender, and rectangular-parallelepiped-shaped body of said base member including at least one obliquely-forwardly-downwardly-oriented multiplication table having an obliquely-forwardly-downwardly orientation;
c) second indicia disposed on said flat, elongated, and rectangular-shaped second face of said elongated, thin, slender, and rectangular-parallelepiped-shaped body of said base member; said second indicia on said flat, elongated, and rectangular-shaped first face of said elongated, thin, slender, and rectangular-parallelepiped-shaped body of said base member including at least one obliquely-forwardly-downwardly-oriented multiplication table having an obliquely-forwardly-downwardly orientation; and
d) an opaque slide member longitudinally slidably mounted along said base member; said obliquely-forwardly-downwardly orientation of said at least one obliquely-forwardly-downwardly-oriented multiplication table of said first indicia on said flat, elongated, and rectangular-shaped first face of said elongated, thin, slender, and rectangular-parallelepiped-shaped body of said base member and said at least one obliquely-forwardly-downwardly-oriented multiplication table of said second indicia on said flat, elongated, and rectangular-shaped second face of said elongated, thin, slender, and rectangular-parallelepiped-shaped body of said base member allowing said opaque slide member to slide over and hide a product of a desired linear multiplication expression being quizzed of said at least one obliquely-forwardly-downwardly-oriented multiplication table of one of said first indicia on said flat, elongated, and rectangular-shaped first face of said elongated, thin, slender, and rectangular-parallelepiped-shaped body of said base member and said second indicia on said flat, elongated, and rectangular-shaped second face of said elongated, thin, slender, and rectangular-parallelepiped-shaped body of said base member, so that it is not visible while being quizzed, while simultaneously covering and hiding products of three directly subsequent linear multiplication expressions yet to be quizzed of said at least one obliquely-forwardly-downwardly-oriented multiplication table of said one of said first indicia on said flat, elongated, and rectangular-shaped first face of said elongated, thin, slender, and rectangular-parallelepiped-shaped body of said base member and said second indicia on said flat, elongated, and rectangular-shaped second face of said elongated, thin, slender, and rectangular-parallelepiped-shaped body of said base member, so that they cannot be viewed and memorized prior to being quizzed, and allowing said opaque slide member to slide slightly to the right sufficiently to expose said product of said desired linear multiplication expression being quizzed of said at least one obliquely-forwardly-downwardly-oriented multiplication table of said one of said first indicia on said flat, elongated, and rectangular-shaped first face of said elongated, thin, slender, and rectangular-parallelepiped-shaped body of said base member and said second indicia on said flat, elongated, and rectangular-shaped second face of said elongated, thin, slender, and rectangular-parallelepiped-shaped body of said base member while simultaneously exposing a multiplier, an operator, and a multiplicand of a directly subsequent linear multiplication expression yet to be quizzed of said at least one obliquely-forwardly-downwardly-oriented multiplication table of said one of said first indicia on said flat, elongated, and rectangular-shaped first face of said elongated, thin, slender, and rectangular-parallelepiped-shaped body of said base member and said second indicia on said flat, elongated, and rectangular-shaped second face of said elongated, thin, slender, and rectangular-parallelepiped-shaped body of said base member, so that it can be subsequently quizzed, and while simultaneously covering and hiding a product of said directly subsequent linear multiplication expression yet to be quizzed of said at least one obliquely-forwardly-downwardly-oriented multiplication table of said one of said first indicia on said flat, elongated, and rectangular-shaped first face of said elongated, thin, slender, and rectangular-parallelepiped-shaped body of said base member and said second indicia on said flat, elongated, and rectangular-shaped second face of said elongated, thin, slender, and rectangular-parallelepiped-shaped body of said base member, so that it is not visible when being subsequently quizzed.

2. The quizzer as defined in claim 1, wherein said base member is selected from the group consisting of pressboard, plastic, rubber, wood, and metal, so that said base member is of sturdy construction.

3. The quizzer as defined in claim 1, wherein said elongated, thin, slender, and rectangular-parallelepiped-shaped body of said base member further has a thin and straight upper longitudinal side with ends, a thin and straight lower longitudinal side with ends and spaced below, and parallel to, said thin and straight upper longitudinal side of said elongated, thin, slender, and rectangular-parallelepiped-shaped body of said base member, a pair of thin, straight, spaced-apart, and parallel lateral ends that perpendicularly connect said ends of said thin and straight upper longitudinal side of said elongated, thin, slender, and rectangular-parallelepiped-shaped body of said base member to respective said ends of said thin and straight lower longitudinal side of said elongated, thin, slender, and rectangular-parallelepiped-shaped body of said base member; said flat, elongated, and rectangular-shaped first face of said elongated, thin, slender, and rectangular-parallelepiped-shaped body of said base member extends from one end of said pair of thin, straight, spaced-apart, and parallel lateral ends of said elongated, thin, slender, and rectangular-parallelepiped-shaped body of said base member to another end of said pair of thin, straight, spaced-apart, and parallel lateral ends of said elongated, thin, slender, and rectangular-parallelepiped-shaped body of said base member, and from said thin and straight upper longitudinal side of said elongated, thin, slender, and rectangular-parallelepiped-shaped body of said base member to said thin and straight lower longitudinal side of said elongated, thin, slender, and rectangular-parallelepiped-shaped body of said base member; said flat, elongated, and rectangular-shaped second face of said elongated, thin, slender, and rectangular-parallelepiped-shaped body of said base member is parallel to, and spaced from, said flat, elongated, and rectangular-shaped first face of said elongated, thin, slender, and rectangular-parallelepiped-shaped body of said base member; said flat, elongated, and rectangular-shaped second face of said elongated, thin, slender, and rectangular-parallelepiped-shaped body of said base member extends from said one end of said pair of thin, straight, spaced-apart, and parallel lateral ends of said elongated, thin, slender, and rectangular-parallelepiped-shaped body of said base member to said another end of said pair of thin, straight, spaced-apart, and parallel lateral ends of said elongated, thin, slender, and rectangular-parallelepiped-shaped body of said base member, and from said thin and straight upper longitudinal side of said elongated, thin, slender, and rectangular-parallelepiped-shaped body of said base member to said base thin and straight lower longitudinal side of said elongated, thin, slender, and rectangular-parallelepiped-shaped body of said base member.

4. The quizzer as defined in claim 3, wherein said base member further has a pair of slender and spaced-apart lateral end extensions that are coplanar with said elongated, thin, slender, and rectangular-parallelepiped-shaped body of said base member; each extension of said pair of slender and spaced-apart lateral end extensions is integrally formed with a respective end of said pair of thin, straight, spaced-apart, and parallel lateral ends of said elongated, thin, slender, and rectangular-parallelepiped-shaped body of said base member and extends perpendicularly outwardly past said thin and straight upper longitudinal side of said elongated, thin, slender, and rectangular-parallelepiped-shaped body of said base member and said thin and straight lower longitudinal side of said elongated, thin, slender, and rectangular-parallelepiped-shaped body of said base member so as to form therewith stops, so that said opaque slide member is prevented from sliding off said base member when said slide member is slid longitudinally therealong.

5. The quizzer as defined in claim 4, wherein said each extension of said pair of slender and spaced-apart lateral end extensions is approximately 0.375" wide and extends approximately 0.125" perpendicularly outwardly past said thin and straight upper longitudinal side of said elongated, thin, slender, and rectangular-parallelepiped-shaped body of said base member and said thin and straight lower longitudinal side of said elongated, thin, slender, and rectangular-parallelepiped-shaped body of said base member.

6. The quizzer as defined in claim 3, wherein said obliquely-forwardly-downwardly-oriented multiplication table of said first indicia on said flat, elongated, and rectangular-shaped first face of said elongated, thin, slender, and rectangular-parallelepiped-shaped body of said base member includes an obliquely-forwardly-downwardly-oriented zero multiplication table that originates at said one end of said pair of thin, straight, spaced-apart, and parallel lateral ends of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented zero multiplication table of said first indica on said flat, elongated, and rectangular-shaped first face of said elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member 12, and includes linear multiplication expressions 0×0=0 to 0×12=0, inclusive, that are disposed consecutively in a column; each subsequent linear multiplication expression of said thirteen individual linear multiplication expressions of said obliquely-forwardly-downwardly-oriented zero multiplication table of said first face indica on said flat, elongated, and rectangular-shaped first face of said elongated, thin, slender, and rectangular-parallelepiped-shaped body of said base member is disposed below, and offset slightly to right of, a directly previous linear multiplication expression of said thirteen individual linear multiplication expressions of said obliquely-forwardly-downwardly-oriented zero multiplication table of said first indica on said flat, elongated, and rectangular-shaped first face of said elongated, thin, slender, and rectangular-parallelepiped-shaped body of said base member.

7. The quizzer as defined in claim 6, wherein said obliquely-forwardly-downwardly-oriented multiplication table of said first indica on said flat, elongated, and rectangular-shaped first face of said elongated, thin, slender, and rectangular-parallelepiped-shaped body of said base member further includes an obliquely-forwardly-downwardly-oriented one multiplication table that is disposed at adjacent right of said obliquely-forwardly-downwardly-oriented zero multiplication table of said first indica on said flat, elongated, and rectangular-shaped first face of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented one multiplication table of said first indica on said flat, elongated, and rectangular-shaped first face of said base member elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 1×0=0 to 1×12=12, inclusive, that are disposed consecutively in a column; each subsequent linear multiplication expression of said obliquely-forwardly-downwardly-oriented one multiplication table of said first indica on said flat, elongated, and rectangular-shaped first face of said elongated, thin, slender, and rectangular-parallelepiped-shaped body of said base member is disposed below, and offset slightly to right of, a directly previous linear multiplication expression of said obliquely-forwardly-downwardly-oriented one multiplication table of said first indica on said flat, elongated, and rectangular-shaped first face of said elongated, thin, slender, and rectangular-parallelepiped-shaped body of said base member.

8. The quizzer as defined in claim 7, wherein said obliquely-forwardly-downwardly-oriented multiplication table of said first indica on said flat, elongated, and rectangular-shaped first face of said elongated, thin, slender, and rectangular-parallelepiped-shaped body of said base member further includes an obliquely-forwardly-downwardly-oriented two multiplication table that is disposed at adjacent right of said obliquely-forwardly-downwardly-oriented one multiplication table of said first indica on said flat, elongated, and rectangular-shaped first face of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented two multiplication table of said first indica on said flat, elongated, and rectangular-shaped first face of said base member elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 2×0=0 to 2×12=24, inclusive, that are disposed consecutively in a column; each subsequent linear multiplication expression of said obliquely-forwardly-downwardly-oriented two multiplication table of said first indica on said flat, elongated, and rectangular-shaped first face of said elongated, thin, slender, and rectangular-parallelepiped-shaped body of said base member is disposed below, and offset slightly to right of, a directly previous linear multiplication expression of said obliquely-forwardly-downwardly-oriented two multiplication table of said first indica on said flat, elongated, and rectangular-shaped first face of said elongated, thin, slender, and rectangular-parallelepiped-shaped body of said base member.

9. The quizzer as defined in claim 8, wherein said obliquely-forwardly-downwardly-oriented multiplication table of said first indica on said flat, elongated, and rectangular-shaped first face of said elongated, thin, slender, and rectangular-parallelepiped-shaped body of said base member further includes an obliquely-forwardly-downwardly-oriented three multiplication table that is disposed at adjacent right of said obliquely-forwardly-downwardly-oriented two multiplication table of said first indica on said flat, elongated, and rectangular-shaped first face of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented three multiplication table of said first indica on said flat, elongated, and rectangular-shaped first face of said base member elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 3×0=0 to 3×12= 36, inclusive, that are disposed consecutively in a column; each subsequent linear multiplication expression of said obliquely-forwardly-downwardly-oriented three multiplication table of said first indica on said flat, elongated, and rectangular-shaped first face of said elongated, thin, slender, and rectangular-parallelepiped-shaped body of said base member is disposed below, and offset slightly to right of, a directly previous linear multiplication expression of said obliquely-forwardly-downwardly-oriented three multiplication table of said first indica on said flat, elongated, and rectangular-shaped first face of said elongated, thin, slender, and rectangular-parallelepiped-shaped body of said base member.

10. The quizzer as defined in claim 9, wherein said obliquely-forwardly-downwardly-oriented multiplication table of said first indica on said flat, elongated, and rectangular-shaped first face of said elongated, thin, slender, and rectangular-parallelepiped-shaped body of said base member further includes an obliquely-forwardly-downwardly-oriented four multiplication table that is disposed at adjacent right of said obliquely-forwardly-downwardly-oriented three multiplication table of said first indica on said flat, elongated, and rectangular-shaped first face of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented four multiplication table of said first indica on said flat, elongated, and rectangular-shaped first face of said base member elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 4×0=0 to 4×12= 48, inclusive, that are disposed consecutively in a column; each subsequent linear multiplication expression of said obliquely-forwardly-downwardly-oriented four multiplication table of said first indica on said flat, elongated, and rectangular-shaped first face of said elongated, thin, slender, and rectangular-parallelepiped-shaped body of said base member is disposed below, and offset slightly to right of, a directly previous linear multiplication expression of said obliquely-forwardly-downwardly-oriented four multiplication table of said first indica on said flat, elongated, and rectangular-shaped first face of said elongated, thin, slender, and rectangular-parallelepiped-shaped body of said base member.

11. The quizzer as defined in claim 10, wherein said obliquely-forwardly-downwardly-oriented multiplication table of said first indica on said flat, elongated, and rectangular-shaped first face of said elongated, thin, slender, and rectangular-parallelepiped-shaped body of said base member further includes an obliquely-forwardly-downwardly-oriented five multiplication table that is disposed at adjacent right of said obliquely-forwardly-downwardly-oriented four multiplication table of said first indica on said flat, elongated, and rectangular-shaped first face of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented five multiplication table of said first indica on said flat, elongated, and rectangular-shaped first face of said base member elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 5×0=0 to 5×12= 60, inclusive, that are disposed consecutively in a column; each subsequent linear multiplication expression of said obliquely-forwardly-downwardly-oriented five multiplication table of said first indica on said flat, elongated, and rectangular-shaped first face of said elongated, thin, slender, and rectangular-parallelepiped-shaped body of said base member is disposed below, and offset slightly to right of, a directly previous linear multiplication expression of said obliquely-forwardly-downwardly-oriented five multiplication table of said first indica on said flat, elongated, and rectangular-shaped first face of said elongated, thin, slender, and rectangular-parallelepiped-shaped body of said base member.

12. The quizzer as defined in claim 11, wherein said obliquely-forwardly-downwardly-oriented multiplication table of said first indica on said flat, elongated, and rectangular-shaped first face of said elongated, thin, slender, and rectangular-parallelepiped-shaped body of said base member further includes an obliquely-forwardly-downwardly-oriented six multiplication table that is disposed at adjacent right of said obliquely-forwardly-downwardly-oriented five multiplication table of said first indica on said flat, elongated, and rectangular-shaped first face of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented six multiplication table of said first indica on said flat, elongated, and rectangular-shaped first face of said base member elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 6×0=0 to 6×12=72, inclusive, that are disposed consecutively in a column; each subsequent linear multiplication expression of said obliquely-forwardly-downwardly-oriented six multiplication table of said first indicia on said flat, elongated, and rectangular-shaped first face of said elongated, thin, slender, and rectangular-parallelepiped-shaped body of said base member is disposed below, and offset slightly to right of, a directly previous linear multiplication expression of said obliquely-forwardly-downwardly-oriented six multiplication table of said first indicia on said flat, elongated, and rectangular-shaped first face of said elongated, thin, slender, and rectangular-parallelepiped-shaped body of said base member.

13. The quizzer as defined in claim 3, wherein said obliquely-forwardly-downwardly-oriented multiplication table of said second indicia on said flat, elongated, and rectangular-shaped second face of said elongated, thin, slender, and rectangular-parallelepiped-shaped body of said base member includes an obliquely-forwardly-downwardly-oriented seven multiplication table that originates at said one end of said pair of thin, straight, spaced-apart, and parallel lateral ends of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented seven multiplication table of said second indicia on said flat, elongated, and rectangular-shaped second face of said elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 7×0=0 to 7×12=84, inclusive, that are disposed consecutively in a column; each subsequent linear multiplication expression of said thirteen individual linear multiplication expressions of said obliquely-forwardly-downwardly-oriented seven multiplication table of said second face indicia on said flat, elongated, and rectangular-shaped second face of said elongated, thin, slender, and rectangular-parallelepiped-shaped body of said base member is disposed below, and offset slightly to right of, a directly previous linear multiplication expression of said thirteen individual linear multiplication expressions of said obliquely-forwardly-downwardly-oriented seven multiplication table of said second indicia on said flat, elongated, and rectangular-shaped second face of said elongated, thin, slender, and rectangular-parallelepiped-shaped body of said base member.

14. The quizzer as defined in claim 13, wherein said obliquely-forwardly-downwardly-oriented multiplication table of said second indicia on said flat, elongated, and rectangular-shaped second face of said elongated, thin, slender, and rectangular-parallelepiped-shaped body of said base member further includes an obliquely-forwardly-downwardly-oriented eight multiplication table that is disposed at adjacent right of said obliquely-forwardly-downwardly-oriented seven multiplication table of said second indicia on said flat, elongated, and rectangular-shaped second face of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented eight multiplication table of said second indicia on said flat, elongated, and rectangular-shaped second face of said base member elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 8×0=0 to 8×12=96, inclusive, that are disposed consecutively in a column; each subsequent linear multiplication expression of said obliquely-forwardly-downwardly-oriented eight multiplication table of said second indicia on said flat, elongated, and rectangular-shaped second face of said elongated, thin, slender, and rectangular-parallelepiped-shaped body of said base member is disposed below, and offset slightly to right of, a directly previous linear multiplication expression of said obliquely-forwardly-downwardly-oriented eight multiplication table of said second indicia on said flat, elongated, and rectangular-shaped second face of said elongated, thin, slender, and rectangular-parallelepiped-shaped body of said base member.

15. The quizzer as defined in claim 14, wherein said obliquely-forwardly-downwardly-oriented multiplication table of said second indicia on said flat, elongated, and rectangular-shaped second face of said elongated, thin, slender, and rectangular-parallelepiped-shaped body of said base member further includes an obliquely-forwardly-downwardly-oriented nine multiplication table that is disposed at adjacent right of said obliquely-forwardly-downwardly-oriented eight multiplication table of said second indicia on said flat, elongated, and rectangular-shaped second face of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented nine multiplication table of said second indicia on said flat, elongated, and rectangular-shaped second face of said base member elongated, thin, slender, and rectangularparallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 9×0=0 to 9×12=108, inclusive, that are disposed consecutively in a column; each subsequent linear multiplication expression of said obliquely-forwardly-downwardly-oriented nine multiplication table of said second indica on said flat, elongated, and rectangular-shaped second face of said elongated, thin, slender, and rectangular-parallelepiped-shaped body of said base member is disposed below, and offset slightly to right of, a directly previous linear multiplication expression of said obliquely-forwardly-downwardly-oriented nine multiplication table of said second indica on said flat, elongated, and rectangular-shaped second face of said elongated, thin, slender, and rectangular-parallelepiped-shaped body of said base member.

16. The quizzer as defined in claim 15, wherein said obliquely-forwardly-downwardly-oriented multiplication table of said second indica on said flat, elongated, and rectangular-shaped second face of said elongated, thin, slender, and rectangular-parallelepiped-shaped body of said base member further includes an obliquely-forwardly-downwardly-oriented ten multiplication table that is disposed at adjacent right of said obliquely-forwardly-downwardly-oriented nine multiplication table of said second indica on said flat, elongated, and rectangular-shaped second face of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented ten multiplication table of said second indica on said flat, elongated, and rectangular-shaped second face of said base member elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 10×0=0 to 10×12=120, inclusive, that are disposed consecutively in a column; each subsequent linear multiplication expression of said obliquely-forwardly-downwardly-oriented ten multiplication table of said second indica on said flat, elongated, and rectangular-shaped second face of said elongated, thin, slender, and rectangular-parallelepiped-shaped body of said base member is disposed below, and offset slightly to right of, a directly previous linear multiplication expression of said obliquely-forwardly-downwardly-oriented ten multiplication table of said second indica on said flat, elongated, and rectangular-shaped second face of said elongated, thin, slender, and rectangular-parallelepiped-shaped body of said base member.

17. The quizzer as defined in claim 16, wherein said obliquely-forwardly-downwardly-oriented multiplication table of said second indica on said flat, elongated, and rectangular-shaped second face of said elongated, thin, slender, and rectangular-parallelepiped-shaped body of said base member further includes an obliquely-forwardly-downwardly-oriented eleven multiplication table that is disposed at adjacent right of said obliquely-forwardly-downwardly-oriented ten multiplication table of said second indica on said flat, elongated, and rectangular-shaped second face of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented eleven multiplication table of said second indica on said flat, elongated, and rectangular-shaped second face of said base member elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 11×0=0 to 11×12=132, inclusive, that are disposed consecutively in a column; each subsequent linear multiplication expression of said obliquely-forwardly-downwardly-oriented eleven multiplication table of said second indica on said flat, elongated, and rectangular-shaped second face of said elongated, thin, slender, and rectangular-parallelepiped-shaped body of said base member is disposed below, and offset slightly to right of, a directly previous linear multiplication expression of said obliquely-forwardly-downwardly-oriented eleven multiplication table of said second indica on said flat, elongated, and rectangular-shaped second face of said elongated, thin, slender, and rectangular-parallelepiped-shaped body of said base member.

18. The quizzer as defined in claim 17, wherein said obliquely-forwardly-downwardly-oriented multiplication table of said second indica on said flat, elongated, and rectangular-shaped second face of said elongated, thin, slender, and rectangular-parallelepiped-shaped body of said base member further includes an obliquely-forwardly-downwardly-oriented twelve multiplication table that is disposed at adjacent right of said obliquely-forwardly-downwardly-oriented eleven multiplication table of said second indica on said flat, elongated, and rectangular-shaped second face of said elongated, thin, slender, and rectangular-parallelepiped-shaped body of said base member, and extends obliquely-forwardly-downwardly from said thin and straight upper longitudinal side of said elongated, thin, slender, and rectangular-parallelepiped-shaped body of said base member, towards said another end of said pair of thin, straight, spaced-apart, and parallel lateral ends of said elongated, thin, slender, and rectangular-parallelepiped-shaped body of said base member, to said thin and straight lower longitudinal side of said elongated, thin, slender, and rectangular-parallelepiped-shaped body of said base member; said obliquely-forwardly-downwardly-oriented twelve multiplication table of said second indica on said flat, elongated, and rectangular-shaped second face of said base member elongated, thin, slender, and rectangular-parallelepiped-shaped body of said base member is made up of thirteen individual linear multiplication expressions that are disposed below each other, are oriented longitudinally along said elongated, thin, slender, and rectangular-parallelepiped-shaped body of said base member, and includes linear multiplication expressions 12×0=0 to 12×12=144, inclusive, that are disposed consecutively in a column; each subsequent linear multiplication expression of said obliquely-forwardly-downwardly-oriented twelve multiplication table of said second indica on said flat, elongated, and rectangular-shaped second face of said elongated, thin, slender, and rectangular-parallelepiped-shaped body of said base member is disposed below, and offset slightly to right of, a directly previous linear multiplication expression of said obliquely-forwardly-downwardly-oriented twelve multiplication table of said second indica on said flat, elongated, and rectangular-shaped second face of said elongated, thin, slender, and rectangular-parallelepiped-shaped body of said base member.

19. The quizzer as defined in claim 3, wherein said opaque slide member is selected from the group consisting of pressboard, plastic, rubber, wood, and metal, so that said base member is of sturdy construction.

20. The quizzer as defined in claim 3, wherein said opaque slide member is approximately 0.625" wide, and completely encircles said base member elongated, thin, slender, and rectangular-parallelepiped-shaped body of said base member, with a wall thickness of approximately 0.0625".

21. The quizzer as defined in claim 3, wherein said opaque slide member has a rectangular-parallelepiped-shaped body, so that it can be easily manufactured while fully cooperating with function of said obliquely-forwardly-downwardly orientation of said at least one obliquely-forwardly-downwardly-oriented multiplication table of said one of said first indica on said flat, elongated, and rectangular-shaped first face of said elongated, thin, slender, and rectangular-parallelepiped-shaped body of said base member and said second indica on said flat, elongated, and rectangular-shaped second face of said elongated, thin, slender, and rectangular-parallelepiped-shaped body of said base member without said need for transparent portions thereon that would be necessary if said at least one obliquely-forwardly-downwardly-oriented multiplication table of said one of said first indica on said flat, elongated, and rectangular-shaped first face of said elongated, thin, slender, and rectangular-parallelepiped-shaped body of said base member and said second indica on said flat, elongated, and rectangular-shaped second face of said elongated, thin, slender, and rectangular-parallelepiped-shaped body of said base member were not obliquely-forwardly-downwardly oriented; said rectangular-parallelepiped-shaped body of said opaque slide member has a rectangular-parallelepiped-shaped throughslot that extends therethrough and slidably receives said elongated, thin, slender, and rectangular-parallelepiped-shaped body of said base member for translation thereacross; said rectangular-parallelepiped-shaped throughslot in said rectangular-parallelepiped-shaped body of said opaque slide member is defined by a rectangular-shaped first longitudinal portion that slidably abuts against said elongated, and rectangular-shaped first face of said elongated, thin, slender, and rectangular-parallelepiped-shaped body of said base member; said rectangular-parallelepiped-shaped throughslot in said rectangular-parallelepiped-shaped body of said opaque slide member is further defined by a rectangular-shaped second longitudinal portion that is parallel to, and spaced from, said rectangular-shaped first longitudinal portion of said rectangular-parallelepiped-shaped body of said opaque slide member, and slidably abuts against said flat, elongated, and rectangular-shaped second face of said elongated, thin, slender, and rectangular-parallelepiped-shaped body of said base member; said rectangular-parallelepiped-shaped throughslot in said rectangular-parallelepiped-shaped body of said opaque slide member is further defined by a rectangular-shaped upper lateral portion that perpendicularly connects upper ends of said rectangular-shaped first longitudinal portion of said rectangular-parallelepiped-shaped body of said opaque slide member and said rectangular-shaped second longitudinal portion of said rectangular-parallelepiped-shaped body of said opaque slide member, and slidably abuts against said thin and straight upper longitudinal side of said elongated, thin, slender, and rectangular-parallelepiped-shaped body; said rectangular-parallelepiped-shaped throughslot in said rectangular-parallelepiped-shaped body of said opaque slide member is further defined by a rectangular-shaped lower lateral portion that is parallel to, and spaced below, said rectangular-shaped upper lateral portion of said slide member rectangular-parallelepiped-shaped body of said opaque slide member, perpendicularly connects lower ends of said rectangular-shaped first longitudinal portion of said rectangular-parallelepiped-shaped body of said opaque slide member and said rectangular-shaped second longitudinal portion of said rectangular-parallelepiped-shaped body of said opaque slide member, and slidably abuts against said thin and straight lower longitudinal side of said elongated, thin, slender, and rectangular-parallelepiped-shaped body.

22. The quizzer as defined in claim 1, wherein said elongated, thin, slender, and rectangular-parallelepiped-shaped body of said base member is approximately 10.125" long, 0.0625" thick, and 2.25" wide.

23. The quizzer as defined in claim 1, wherein said first indica on said flat, elongated, and rectangular-shaped first face of said elongated, thin, slender, and rectangular-parallelepiped-shaped body of said base member is one of printed on, typed on, and imprinted into, said flat, elongated, and rectangular-shaped first face of said elongated, thin, slender, and rectangular-parallelepiped-shaped body of said base member, so that little wear thereto is encountered; said second indica on said flat, elongated, and rectangular-shaped second face of said elongated, thin, slender, and rectangular-parallelepiped-shaped body of said base member is one of printed on, typed on, and imprinted into, said flat, elongated, and rectangular-shaped second face of said elongated, thin, slender, and rectangular-parallelepiped-shaped body of said base member, so that little wear thereto is encountered.

24. A method of utilizing a multiplication quizzer to learn multiplication tables, comprising the steps of:
 a) determining which at least one obliquely-forwardly-downwardly oriented multiplication table of one of a first indica on a flat, elongated, and rectangular-shaped first face of an elongated, thin, slender, and rectangular-parallelepiped-shaped body of a base member and a second indica on a flat, elongated, and rectangular-shaped second face of said elongated, thin, slender, and rectangular-parallelepiped-shaped body of said base member of said multiplication quizzer is to be quizzed;
 b) sliding a rectangular-parallelepiped-shaped body of an opaque slide member of said multiplication quizzer across said elongated, thin, slender, and rectangular-parallelepiped-shaped body of said base member, with said rectangular-parallelepiped-shaped body of said opaque slide member sliding abuttingly through a rectangular-parallelepiped-shaped throughslot in said rectangular-parallelepiped-shaped body of said opaque slide member until a multiplier, an operator, and an multiplicand of a desired expression being quizzed of said obliquely-forwardly-downwardly oriented multiplication table of said one of said first indica on said flat, elongated, and rectangular-shaped first face of said elongated, thin, slender, and rectangular-parallelepiped-shaped body of said base member and said second indica on said flat, elongated, and rectangular-shaped second face of said elongated, thin, slender, and rectangular-parallelepiped-shaped body of said base member is visible, so that it can be quizzed, while a product of said desired expression being quizzed of said obliquely-forwardly-downwardly oriented multiplication table of said one of said first indica on said flat, elongated, and rectangular-shaped first face of said elongated, thin, slender, and rectangular-parallelepiped-shaped body of said base member and said second indica on said flat, elongated, and rectangular-shaped second face of said elongated, thin, slender, and rectangular-parallelepiped-shaped body of said base member is simultaneously covered and hid by said rectangular-parallelepiped-shaped body of said opaque slide member, so that it is not visible while being quizzed, and products of three directly subsequent expressions of said obliquely-forwardly-downwardly oriented multiplication table of said one of said first indica on said flat, elongated, and rectangular-shaped first face of said elongated, thin, slender, and rectangular-parallelepiped-shaped body of said base member and said second indica on said flat, elongated, and rectangular-shaped second face of said elongated, thin, slender, and rectangular-parallelepiped-shaped body of said base member yet to be quizzed are also simultaneously covered and hid by said rectangular-parallelepiped-shaped body of said opaque slide member, so that they can not be viewed and memorized prior to being quizzed;

c) determining said product of said desired expression of said obliquely-forwardly-downwardly oriented multiplication table of said one of said first indica on said flat, elongated, and rectangular-shaped first face of said elongated, thin, slender, and rectangular-parallelepiped-shaped body of said base member and said second indica on said flat, elongated, and rectangular-shaped second face of said elongated, thin, slender, and rectangular-parallelepiped-shaped body of said base member;

d) sliding said rectangular-parallelepiped-shaped body of said opaque slide member slightly longitudinally to the right across said elongated, thin, slender, and rectangular-parallelepiped-shaped body of said base member, with said rectangular-parallelepiped-shaped body of said opaque slide member sliding abuttingly through said rectangular-parallelepiped-shaped throughslot in said rectangular-parallelepiped-shaped body of said opaque slide member, only until said product of said desired expression being quizzed of said obliquely-forwardly-downwardly oriented multiplication table of said one of said first indica on said flat, elongated, and rectangular-shaped first face of said elongated, thin, slender, and rectangular-parallelepiped-shaped body of said base member and said second indica on said flat, elongated, and rectangular-shaped second face of said elongated, thin, slender, and rectangular-parallelepiped-shaped body of said base member is visible and a multiplier, an operator, and a multiplicand of a directly subsequent expression yet to be quizzed of said obliquely-forwardly-downwardly oriented multiplication table of said one of said first indica on said flat, elongated, and rectangular-shaped first face of said elongated, thin, slender, and rectangular-parallelepiped-shaped body of said base member and said second indica on said flat, elongated, and rectangular-shaped second face of said elongated, thin, slender, and rectangular-parallelepiped-shaped body of said base member is simultaneously visible, so that it can be subsequently quizzed, and a product of said directly subsequent expression yet to be quizzed of said obliquely-forwardly-downwardly oriented multiplication table of said one of said first indica on said flat, elongated, and rectangular-shaped first face of said elongated, thin, slender, and rectangular-parallelepiped-shaped body of said base member and said second indica on said flat, elongated, and rectangular-shaped second face of said elongated, thin, slender, and rectangular-parallelepiped-shaped body of said base member is simultaneously covered and hid by said rectangular-parallelepiped-shaped body of said opaque slide member, so that it is not visible when being subsequently quizzed; and e) repeating steps c) and d) for a next directly subsequent expression to be quizzed, if present, of said obliquely-forwardly-downwardly oriented multiplication table of said one of said first indica on said flat, elongated, and rectangular-shaped first face of said elongated, thin, slender, and rectangular-parallelepiped-shaped body of said base member and said second indica on said flat, elongated, and rectangular-shaped second face of said elongated, thin, slender, and rectangular-parallelepiped-shaped body of said base member.

* * * * *